US012709942B2

(12) United States Patent
Hay, III

(10) Patent No.: US 12,709,942 B2
(45) Date of Patent: Aug. 18, 2026

(54) COASTAL WEATHER WINDOW AND DOOR SYSTEM WITH INTERIOR MOUNTING ASSEMBLY

(71) Applicant: HAWKES DESIGN AND CONSULTING, LLC., Charleston, SC (US)

(72) Inventor: Henry M. Hay, III, Charleston, SC (US)

(73) Assignee: HAWKES DESIGN AND CONSULTING, LLC., Charleston, SC (US)

( * ) Notice: Subject to any disclaimer, the term of this patent is extended or adjusted under 35 U.S.C. 154(b) by 535 days.

(21) Appl. No.: 18/109,652

(22) Filed: Feb. 14, 2023

(65) Prior Publication Data

US 2023/0193687 A1 Jun. 22, 2023

Related U.S. Application Data

(63) Continuation-in-part of application No. 17/964,577, filed on Oct. 12, 2022, which is a continuation-in-part of application No. 17/109,766, filed on Dec. 2, 2020, now Pat. No. 11,499,362.

(60) Provisional application No. 63/044,576, filed on Jun. 26, 2020.

(51) Int. Cl.
*E06B 1/34* (2006.01)
*E06B 1/00* (2006.01)
(Continued)

(52) U.S. Cl.
CPC .................. *E06B 9/02* (2013.01); *E06B 1/34* (2013.01); *E06B 1/60* (2013.01);
(Continued)

(58) Field of Classification Search
None
See application file for complete search history.

(56) References Cited

U.S. PATENT DOCUMENTS 4,193,235 A * 3/1980 Cucchiara ............... E06B 3/285
52/745.16
5,857,298 A * 1/1999 Fullwood ............ E06B 9/17007
52/656.7
(Continued)

FOREIGN PATENT DOCUMENTS

DE 0136614 A3 * 9/1984
DE 202007014393 U1 * 2/2008 ........... E06B 3/5821

*Primary Examiner* — Phi D A
(74) *Attorney, Agent, or Firm* — Bryan L. Baysinger; Thomas R. Parker, II; Maynard Nexsen PC

(57) ABSTRACT

Disclosed is a storm protection system and method with an interior mounting assembly. In one aspect, the disclosure comprises a first jamb, a second jamb, a header, and a sill, each with a glazing recess, and each with a receptacle for inserting a screw boss that runs a length of each of the first jamb, the second jamb, the header, and the sill, wherein joined define a frame for the opening in a building. A storm protection system may further comprise glazing received by the glazing recess of each of the first jamb, the second jamb, the header, and the sill. A storm protection system may further comprise a storm track configured to the frame to, wherein the storm track identifies fastener locations for the screw boss within the frame, and wherein the storm track comprises a cap, a stanchion, and an attachment layer for attachment to the frame. The system further comprises an interior mounting bracket that allows for the addition of window treatments through the existing frame hardware and storm protection.

21 Claims, 25 Drawing Sheets

(51) Int. Cl.

| | |
|---|---|
| ***E06B 3/64*** | (2006.01) |
| ***E06B 3/96*** | (2006.01) |
| ***E06B 9/02*** | (2006.01) |
| *E06B 1/60* | (2006.01) |
| *E06B 3/44* | (2006.01) |
| *E06B 3/54* | (2006.01) |
| *E06B 9/00* | (2006.01) |

(52) U.S. Cl.
CPC ..... *E06B 2003/4492* (2013.01); *E06B 3/5454* (2013.01); *E06B 3/64* (2013.01); *E06B 3/9636* (2013.01); *E06B 2009/005* (2013.01)

(56) References Cited

U.S. PATENT DOCUMENTS

| | | | | |
|---|---|---|---|---|
| 6,125,605 | A * | 10/2000 | Young | E06B 1/62 52/211 |
| 6,195,948 | B1 | 3/2001 | Lamanna | |
| 8,196,363 | B2 | 6/2012 | Hay et al. | |
| 8,438,802 | B1 | 5/2013 | Hay et al. | |
| 8,863,452 | B1 * | 10/2014 | Hay, III | E06B 5/10 52/204.63 |
| D856,534 | S | 8/2019 | Hay, III et al. | |
| D856,535 | S | 8/2019 | Hay | |
| D856,536 | S | 8/2019 | Hay, III et al. | |
| 10,604,989 | B2 | 3/2020 | Hay, III | |
| D884,213 | S | 5/2020 | Hay, III et al. | |
| 10,641,035 | B1 | 5/2020 | Weber et al. | |
| D905,287 | S | 12/2020 | Hay, III | |
| D905,288 | S | 12/2020 | Hay, III | |
| 2010/0186641 | A1 | 7/2010 | Hay, III et al. | |
| 2010/0269432 | A1 | 10/2010 | Furgerson et al. | |
| 2011/0154753 | A1 | 6/2011 | Furgerson et al. | |
| 2014/0326126 | A1 | 11/2014 | Hay, III et al. | |
| 2017/0058593 | A1 | 3/2017 | Albrecht | |
| 2017/0211310 | A1 * | 7/2017 | Gilkey | E06B 3/4415 |
| 2019/0211620 | A1 | 7/2019 | Hay, III | |
| 2019/0264498 | A1 | 8/2019 | Hay, III | |

* cited by examiner

COASTAL WEATHER WINDOW AND DOOR SYSTEM WITH INTERIOR MOUNTING ASSEMBLY

CROSS-REFERENCE TO RELATED APPLICATIONS

This application is a continuation-in-part of and claims the benefit of and priority to U.S. patent application Ser. No. 17/964,577, Customizable Window System for Coastal Weather Protection, filed on Oct. 12, 2022, of which claims priority to U.S. patent application Ser. No. 17/109,766, now U.S. Pat. No. 11,499,362, entitled Customizable Window System for Coastal Weather Protection, filed on Dec. 2, 2020, as well as previously filed U.S. provisional patent application Ser. No. 63/044,576, filed on Jun. 26, 2020, the contents of which are hereby incorporated by reference in their entirety as if fully reiterated herein.

TECHNOLOGY FIELD

This disclosure relates to a window and door framing system and method, in particular for storm protection and reducing or avoiding damage to windows and doors in buildings in coastal areas prone to high winds and hurricanes, as well as providing mounting and installation for an interior assembly for the addition of window treatments.

BACKGROUND

In the past, shutters have been used to protect windows from the strong winds and the driving rains associated with storms and hurricanes. In more recent times, homeowners have used sheets of plywood to cover windows and doors to protect against flying debris. These sheets of plywood are often nailed into the wooden or brick siding of a building, or the window frame itself, leaving noticeable fastener holes and degrading the integrity. In areas where physical security threats are elevated, homeowners may be concerned about window and door breakage along with attempted break-ins when they are away.

Window and door damage from weather occurs in areas that are often along a seacoast or other environment that presents challenges of high winds and flying debris. Hurricanes are a particular problem because of the combination of high winds, heavy rainfall, and the potential for large losses. Current measures taken to protect windows and doors include attaching plywood over framing, such efforts are time-consuming and the homeowner may need to evacuate before completing the task if the storm accelerates its ground speed. Further, such modifications often leave unsightly screw holes and marks on the exterior framing.

In areas where physical security is a concern, the owner has to balance the increased security of installing permanent bars or other window covering against the cost of installation, the effect on appearance, and the impact on the view through the window.

Improvements in glass and protective glass coatings have made it possible to obtain window glass that is much more resistant to scratches and breakage. Improvements have also been made in panels for covering windows in advance of storms, such as panels that can be installed more easily, are translucent, are aesthetically pleasing, and that help to reduce injury and protect property. These measures, however, come at a cost and one that often requires retrofitting and or repairs after installation.

Providing protection for vulnerable windows and doors of a modern home near coastal areas, especially one that may have many windows and glass doors for better enjoyment of the view, can become expensive. Moreover, "outdoor architecture," common to coastal areas, favors more natural light and access to fresh air. The need for window protection is not uniform even in the same home. With respect to hurricane protection, local building codes, for example, may use more protection for windows closer to the ground and less protection, or none at all, for windows in upper floors. Security protection for windows closer to the ground in high crime areas is also greater than for windows on second and third floors.

In locations where extreme weather is a concern, windows can be protected by temporary exterior panels or impact resistant glass; and where security is a concern, security glass, screens or bars may be used. Impact resistant glass is comprised of two sheets of glass bonded together with a protective interlayer. Laminated glass is the primary hurricane barrier used in impact resistant windows. Laminated glass is also used in the windshields of cars. In addition, the interior of a building and its occupants may sometimes be protected by interior panels or impact resistant glass, or both. Windows elevated from the ground so as to necessitate a ladder for installation of exterior panels may be protected by interior panels which are easier to install and protect the occupants, if not the window itself, in the event it is shattered by debris.

Window treatments such as blinds, shutters, and shades enhance the aesthetics and provide practical solutions to sunlight and privacy. These treatments are often installed post framing and installation of a window or door, and often require a professional to mount hardware to a frame. There is a lack of options for do-it-yourself installers, and the installation often requires power tools and specialized skills.

Thus, there is a long sought need to provide a storm window or door, that has customizable options, and pre-defined areas for incorporating window treatments. In doing so, maintaining the safety and security of the window and door, while also providing an elegant solution to appearance and options to customize window treatments.

SUMMARY OF THE INVENTION

According to its major aspects and briefly recited, herein is disclosed a window system that includes a customizable window frame permitting different levels of protection against severe weather or physical security threats using windows that may have the same external appearance of window frame. The inner structure of the frame and the type of glazing can be customized for the windows in the home or building so that the windows may provide a preferred and preselected levels of protection from severe weather or security threats. In addition, the exterior style of the windows and the doors can be identical and can be separately customized with different levels of protection for greater physical security and against severe weather. Further, the interior surface of the frame may be customized with blinds, shades, or other attachments and configured to the interior screw boss so as to provide restraint in all directions, and to secure even heavy attachments for decorative interior purposes or for additional safety purposes.

In some aspects, the techniques described herein relate to a storm protection system with interior options for an opening in a building, including: (a) a first jamb, a second jamb, a header, and a sill, each with a glazing recess, and each with a receptacle for inserting a screw boss that runs a length of each of the first jamb, the second jamb, the header, and the sill, wherein joined define a frame for the opening in a building; (b) glazing received by the glazing recess of each of the first jamb, the second jamb, the header, and the sill; (c) a storm track configured to the frame to, wherein the storm track identifies fastener locations for the screw boss within the frame, and wherein the storm track includes a cap, a stanchion, and an attachment layer for attachment to the frame; and (d) an interior mounting bracket, wherein the interior mounting bracket is configured to be held to the frame through a fastener that enters at least one screw boss or wall of the frame.

In some aspects, the techniques described herein relate to a system, wherein the interior mounting bracket is configured to attach a window treatment.

In some aspects, the techniques described herein relate to a system, wherein the interior mounting bracket is configured to attach a storm resistant panel.

In some aspects, the techniques described herein relate to a system, wherein the interior mounting bracket is secured by two or more fasteners.

In some aspects, the techniques described herein relate to a system, wherein the interior mounting bracket is included of a metal.

In some aspects, the techniques described herein relate to a system, wherein the interior mounting bracket is included of a polymeric material.

In some aspects, the techniques described herein relate to a system, wherein the screw boss is co-extruded with the first jamb, the second jamb, the header, and the sill.

In some aspects, the techniques described herein relate to a system, further including fasteners for securing the frame to the opening in the building, wherein the fasteners pierce a nail fin of the frame.

In some aspects, the techniques described herein relate to a system, wherein the stanchion has a groove to indicate fastener placement to enable fastening to the screw boss that runs the length of each of the first jamb, the second jamb, the header, and the sill.

In some aspects, the techniques described herein relate to a method for installing a storm protection system in an opening of a building, including: installing a first jamb, a second jamb, a header, and a sill, each with a glazing recess, and each with a receptacle for inserting a screw boss that runs a length of each of the first jamb, the second jamb, the header, and the sill, wherein joined define a frame for the opening in a building; securing glazing into the glazing recess of each of the first jamb, the second jamb, the header, and the sill; installing a storm track configured to the frame to, wherein the storm track includes a cap, a stanchion, and an attachment layer for attachment to the frame; fastening an interior mounting bracket to the frame, wherein fastening applies a fastener to the interior mounting bracket and through the screw boss or wall of the frame; and applying a window treatment to the interior mounting bracket.

In some aspects, the techniques described herein relate to a method, wherein fastening the interior mounting bracket pierces at least one wall and one screw boss of the frame.

In some aspects, the techniques described herein relate to a method, wherein fastening the interior mounting bracket pierces at least two independent screw bosses on the frame.

In some aspects, the techniques described herein relate to a method, wherein applying the window treatment applies a window blind to the interior mounting bracket.

In some aspects, the techniques described herein relate to a method, wherein fastening the interior mounting bracket pierces at least two walls of the frame.

In some aspects, the techniques described herein relate to a method, wherein fastening the interior mounting bracket fastens a left interior mounting bracket and a right interior mounting bracket.

In some aspects, the techniques described herein relate to a method, wherein the screw boss is co-extruded with the first jamb, the second jamb, the header, and the sill.

In some aspects, the techniques described herein relate to a method, further including applying fasteners for securing the frame to the opening in the building, wherein the fasteners pierce a nail fin of the frame.

In some aspects, the techniques described herein relate to a method, wherein the stanchion has a groove to indicate fastener placement to enable fastening to the screw boss that runs the length of each of the first jamb, the second jamb, the header, and the sill.

In some aspects, the techniques described herein relate to a method, wherein the interior mounting bracket is included of a metal.

In some aspects, the techniques described herein relate to a method, wherein the interior mounting bracket is fastened by two or more fasteners through defined holes on the interior mounting bracket.

These and other advantages will be apparent to those skilled in the art of window design and installation particularly for buildings in areas where security or severe weather is a concern.

BRIEF DESCRIPTION OF THE DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings

in FIG. 14A, an example extruded lineal of FIG. 13A with a configured storm track comprising a storm cap, a storm stanchion, and a storm attachment layer;

DETAILED DESCRIPTION

Figure 1:
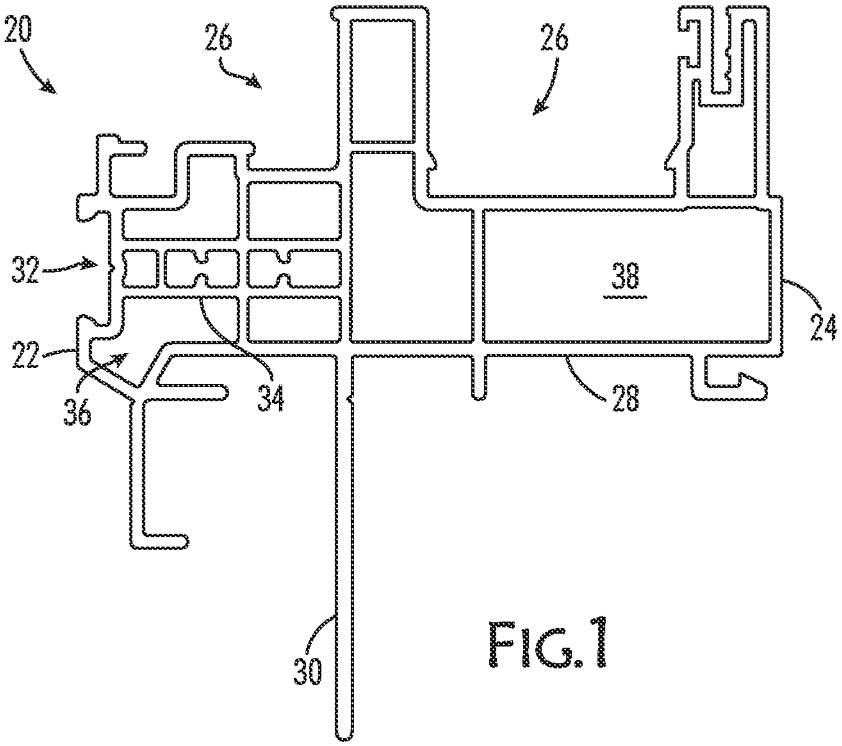
FIG. 1 illustrates a cross-section of an extruded lineal for a window which lineal includes a screw boss co-extruded in a receptor channel on an external side of the frame, and an open channel on the interior side of the frame, according to an aspect of the disclosure.

U.S. Pat. Nos. 10,604,989, 10,641,035, 8,863,452, 8,789,324, and 8,438,802, are assigned to the Applicant of the present application, and are incorporated herein in their entirety by reference.

The term "astragal" refers to hardware that is used on a pair of doors to seal the gap between the doors when they are closed. The astragal is fastened to the doors themselves on the sides of the doors that meet, rather than to a separate door frame.

The term "building" will be used here for convenience to mean any structure with openings in its walls. The structure includes by way of example, and not of limitation, homes, apartment buildings, and commercial buildings. The word "walls" refers to barriers such as walls, ceilings, and floors, that are positioned between the inside of the building and its outside.

The term "customizable" is used herein to describe the ability to choose from a selection of options among protective mechanisms that protect the interior of a building from physical damage as a result of severe weather or a security threat outside the building. The features selected from among the options are added to an extruded, pultruded, or co-extruded frame of a that was manufactured with specific elements. These protective mechanisms improve the ability of the window or door to withstand increased stress from a security threat, high winds, heavy rain, hurricanes, and flying debris or hail.

The term "door" will be used to indicate an entry and egress point in a building, and shall include framing along with the ability to cover the door with the disclosure herein.

The term "extruded" is used herein for convenience but jambs, sills and headers may be formed in any way customary in the industry, for example, pultruded, and co-extruded with other materials.

The term "frame" as used herein, and used in connection with a window or door, such as a "window frame" an "opening frame" or a "door frame," refers to the structure that is attached to a building where a hole has been made in the building for receiving a window or door (or receiving a vent or an appliance such as a wall-mounted air conditioner). The frame is typically a four-sided structure that is sealed to the opening made for it and that holds the window, door, vent, or appliance.

The term "window" will be used to refer to an opening in a wall, as defined herein, such as a window in a wall, a window in a door, a skylight in a ceiling, or a sliding glass door in a wall, where the window has a covering that admits light, unlike the opaque material of the wall, door frame, and roof.

The term "screw boss" is a physical structure that grips the threads of a screw being driven into it so that, once the screw has been inserted into or through the screw boss, the screw boss resists the removal of the screw more when the screw is pulled than when the screw is unscrewed. This installation further provides support for attachments such as high wind panels, blinds, and other attachments, allowing for additional weight support in the frame.

An "insertable screw boss" is a screw boss that has been separately extruded so that it can be inserted into a channel and is otherwise functionally the same as a screw boss extruded as an integral part of that channel, but allowing for further customization depending upon the time of fastener. This installation further provides support for attachments such as high wind panels, blinds, and other attachments, allowing for additional weight support in the frame.

The term "window treatment" means a cover or modification of a window, with an aim of enhancing the aesthetics of the window. For purposes of this definition a window may also appear on a door. Further, a window treatment encompasses hard treatments such as wood, vinyl, aluminum, and window blinds, shades, and drapery fixtures.

A window frame or astragal may be better able to hold a panel if the window frame or astragal as disclosed herein is customized by inclusion of a separately extruded or inserted screw boss, thus allowing greater customization of screw (increased sizing for stronger weather conditions) and which also provides an effective way to hold the screws for attaching panels over a window or a glass door. A panel may be attached to the window or door on the interior of a building or to the building exterior.

Protection for windows higher off the ground, namely, by interior panels may often be more practical than panels installed on the exterior of the window when the window is located higher on the building. Indeed, building codes specify less protection for windows over 30 feet above the ground because they are less subject to damage in high winds. Thus, architectural consistency among the present window and door frames may be preserved so they have same style and frontal appearance and be made from the same extrusion, and the glass in the windows will appear to be the same regardless of whether it is impact resistant glass, safety glass or ordinary window pane glass.

For example, the window or door frames on the lower levels of a multi-level home or office may have extra protection against high winds, blowing dirt, sand and debris. That extra protection can be provided by impact resistant glass and by window frames and door frames that permit easily-attached exterior panels. Upper floors in the same home or office building may have less protection as appropriate or no protection. Protection for windows and doors on one side of the home or office can be greater on, for example, the windward side, than for the windows and doors on the other side. Regardless of the customization of different windows, the external appearance can be uniform.

The ability to customize protection for a window and door is achieved by arranging for the extrusion that will be used to form the frame of the window or door to optionally receive one or more separately-made extrusions by inserting those extrusions into the receptor channels. The inserted extrusions, which may be screw bosses, in addition to adding strength and rigidity to the frame, cooperate with panels or other exterior or interior coverings to enable the occupant to quickly and easily attach interior protection. These coverings may be temporary panels or fabrics that provide protection over the glazing against broken glass. Finally, glass having higher impact resistance or scratch resistance can be specified when the window or door is such that exterior panels and fabrics cannot be easily or safely installed.

In addition, the separately-extruded inserts may be inserted into the jambs only, the header and the sill and not into the jambs, or all sides of the frame made of the header, sill and two jambs, such as for second story windows. Jambs are typically longer as they determine the vertical dimension of the window. Therefore, the cost making and inserting shorter extruded inserts of the headers and sills, as measured in price per linear foot or meter of extrusion, will be less than if the inserts were added to the four components of the frame or to the jambs.

Moreover, separately extruding the inserts for insertion into the receptor channels if and where used reduces costs compared to extruding the frame components with a co-screw boss. The dies are simpler and the additional strength provided by a screw boss insert is applied where used.

Accordingly, an architect or builder can evaluate the relative level of safety protection for the window of a designed structure and specify the level of protection appropriate for that window at the time it is ordered. The windows of the finished structure can nonetheless have the same external appearance and style, as determined by the frontal appearance of the window frame, despite differences in robustness of the windows against severe weather.

When a storm approaches, the owner simply applies panels to the more vulnerable windows, such as those to the windward side, for example, and perhaps to windward windows higher up that are easily reached, such as those opening to an upstairs balcony or deck. The owner may attach panels on the insides of upstairs windows as a precaution against wind-blown debris breaking those windows.

An advantage of being able to customize the protection provided by windows, doors and other openings of a building is that the overall cost of protection is reduced by applying greater window and door protection to those windows and doors that are more vulnerable and less protection or none to those windows that are not likely to be damaged. Being able to customize the protection provided by different windows and doors of a building and provide a pleasing and, if desirable, a uniform external appearance is also an advantage.

Another advantage is that the use of insertable screw bosses for those windows that need protection as opposed to extruded screw bosses used where useful and not in every header, sill, and jamb whether used or not.

The frame of the present system is customized in its interior before the windows or doors are made, and may receive an inserted screw boss in the frame elements just prior to assembly or during extrusion, according to a specification provided for that window or door. There may be one specification for the robustness of the windows or doors on the ground floor, for example, and another one for those on the second floor, particularly if reaching the higher windows to apply panels would be difficult or dangerous. Upper windows may have an inserted screw boss in an interior channel for the attachment of interior panels rather than in the receptor channel for attaching exterior panels, or may have no screw bosses at all, for example, if intended for windows over 30 feet from the ground.

For those windows and doors that would be covered by panels on the approach of bad weather or when there are security concerns, the frame profile will have the desired aesthetic exterior features as the frame of any other window or door of that building. However, there may be a second, interior, screw boss that may be inserted into a receptor channel in the frame profile to provide additional holding power for screws that are to hold a panel to the window or door and possibly for use in an interior channel for holding an interior panel.

In another example of customized severe weather protection, the downstairs windows may be customized for receiving screws to hold panels across the windows, and the upstairs windows may be customized to hold panels on the interior of the window or customized with more robust glass such as safety or high-impact glass or security glass that is more resistant to breakage. The same may be applied to doors, and depending upon the span, for example extra wide door frames or double door frames may have enlarged screw boss inserts.

In a variation of the foregoing example, the upstairs window frames and the downstairs window frames may be customized to hold panels on the inside of the window, and the downstairs windows may be customized to hold panels outside the windows.

The present system allows for customization of what may otherwise appear to be uniform-looking windows and doors by enabling attachment of panels inside or outside of the window or door using frames with co-co-extruded screw bosses or inserted bosses or no screw bosses, and by selecting glazing having different levels of strength and scratch-resistance such as impact resistant glass or security glass, as preferred, or a strengthened screen or barrier, for protecting windows of the home or building. Yet the windows and doors would have a uniform external appearance, thus preserving the exterior quality and aesthetics of the structure.

Turning now to the figures, FIG. 1 shows an end view of a first lineal profile 20 for the configuration of the frame of a window or door. First lineal profile 1 is an example of many possible profiles for window frames and not intended to be limiting. Lineal profile lineal profile 20 shows, for example, a receiver chamber 32 on its left side 22. The left side 22 may be flat or have another configuration and is to a major extent ornamental as it is the part of profile 20 that faces to the exterior. Because the left side 22 is the side to receive panels or protective fabrics, for example, a guide of sorts, such as receiving chamber 32 for the person using screws or nails for attaching the panel or fabric may be helpful.

First lineal profile 20, as shown in FIG. 1, in an end view, is a long, rigid, co-co-extruded article of manufacture that is to be cut into sections, which sections have a specified length and can be assembled (usually the frame has four sections including two jambs, a sill, and a header) into a rectangle that defines a (rectangular) window frame. First lineal profile 20 contains representative internal features common to many window frames. The features of first lineal profile 20 have specific functions and some are decorative, namely those on the left end and right end of FIG. 1 which will become the exterior and interior ends, respectively, of a window frame. The left side 22 of FIG. 1 is the exterior-facing configuration of the frame; the right side 24 of the figure is the interior-facing side of the frame. The window frame constructed from first lineal profile 20 from the outside (the lineal of FIG. 1) when viewed from the left end of FIG. 1) and the inside (the lineal of FIG. 1) when viewed from the right end, will have an aesthetic appearance.

The top of the FIG. 1 shows an end view of the interior configuration of first lineal profile 20 which is the side intended for receiving two glazed windows, which will fit into recesses 26. The bottom 28 of FIG. 1 is the part of first lineal profile 20 that is to be attached to the wall of the building. A nail fin 30 extending from the lower part of FIG. 1 permits the frame of a window defined by first lineal profile 20 to be attached to the framing of the building at the opening for the window.

Linear profile 20 has two other features. On left side 22 of first lineal profile 20, as indicated by an arrow pointing to an entrance, referred to herein as a receptor channel 32, is a co-co-extruded first screw boss 34 in a receptor channel 36. These features, receptor channel 32 and first screw boss 34, facilitate attachment of a panel or other protective exterior covering for protection of glazing held by the frame at recesses 26, and is co-co-extruded as part of first linear profile 20. A screw or other fastener may be driven left to right in left side of FIG. 1 into receptor channel 32, which serves to guide the screw or other fastener into first screw boss 34, which provides additional holding power against withdrawal of screws used to hold a panel to first lineal profile 20.

A screw boss is a device that may be made separately from first lineal profile 20 by extrusion, just as first lineal profile 20 is made, and which screw boss presents a series of barriers across is long dimension, as see in FIGS. 1-5, to the advancement of a screw inserted at receptor channel 32 and driven into any one of first linear profile 20, second linear profile 20', and third linear profile 20". The tip of a long screw penetrates into first screw boss 34 on insertion into first lineal profile 20. A long screw is more difficult to withdraw from a screw boss, such as first screw boss 34, by pulling than to unscrew it, and thus provides resistance to the removal of the screw by force—and thus resists the wind's effect on a panel or other covering over the window. Plural screws (not shown) along the top and bottom or sides of a window frame made using first lineal profile 20 or second lineal profile 20' hold such a panel (not shown) to the exterior of an extruded window frame and the presence of screw bosses in at least two sides of window frame, jambs or sill and header, for example, provide additional security against the force of strong winds pulling on the panel or fabric covering of the frame and subsequently exposing the window glazing to damage.

Figure 2:
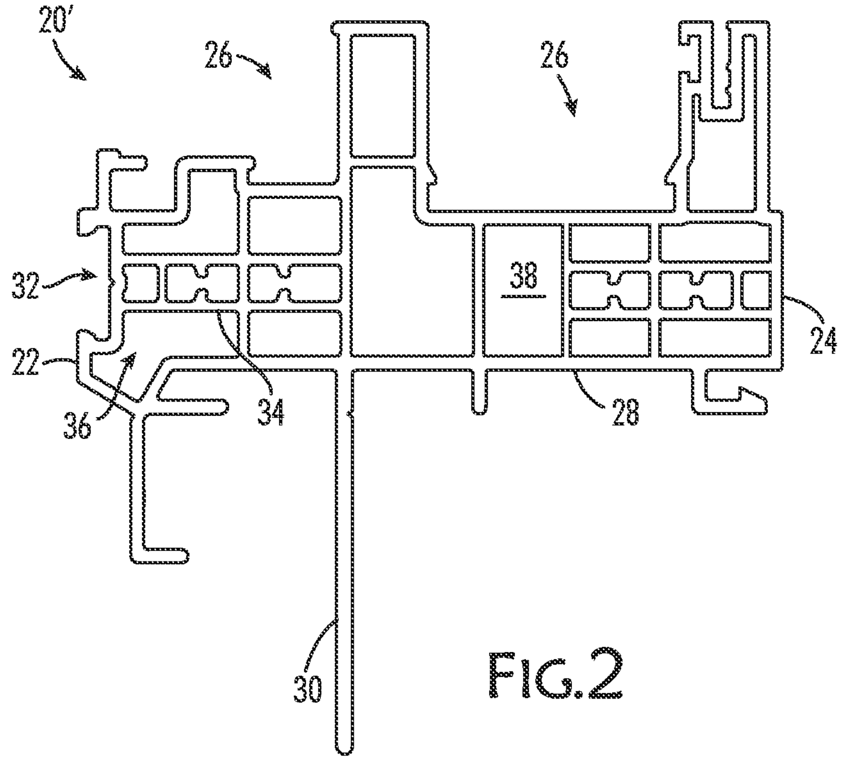
FIG. 2 illustrates the same cross-section of FIG. 1, of the co-extruded lineal for a window, which lineal includes a co-extruded screw boss in the interior channel on the internal side of the frame of FIG. 1, according to an aspect of the disclosure.

FIG. 2, as shown, is second lineal profile 20' having the identical exterior configuration as first lineal profile 20 in FIG. 1, and also has a second screw boss 42 in a second channel 38 on right side 24 of second lineal profile 20'. Reference numbers used FIG. 1 are used in FIG. 2 to indicate the same structures as they indicate in FIG. 1.

FIG. 2 includes second screw boss 42, located in second channel 38 at the right side 24 of the second lineal profile 20', for use in holding a panel (not shown) to the interior of a window frame. Using a panel on the interior side of a window may not protect the window from breaking from debris blown by high winds. The panel may protect the interior of the building and its occupants. Second screw boss 42 thus provides a source of holding power for an interior panel (or other covering).

Figure 3:
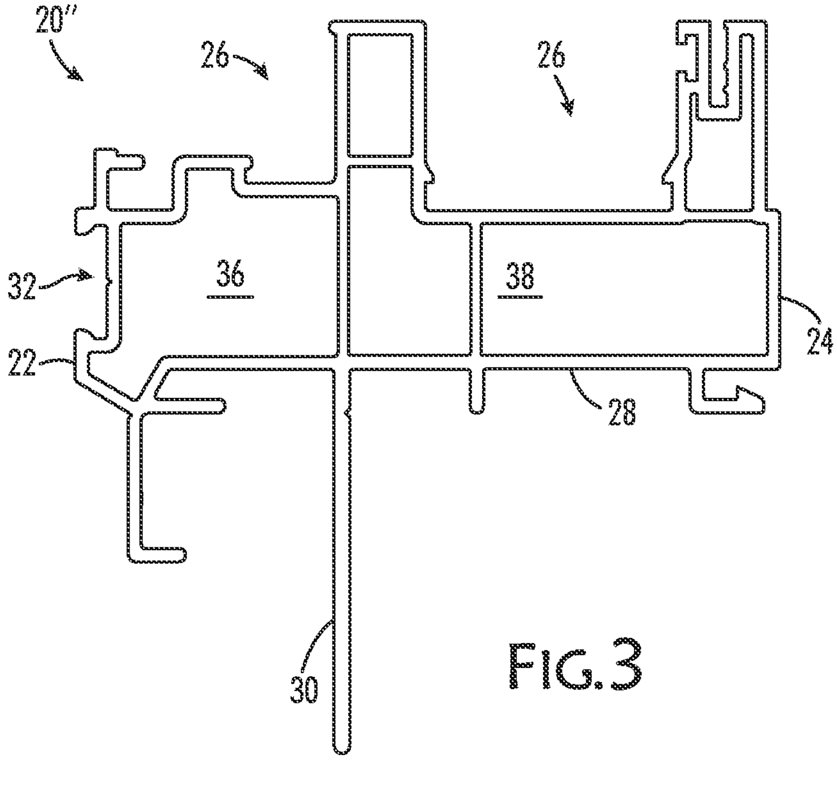
FIG. 3 illustrates a co-extruded lineal for a window that does not include co-extruded screw bosses in the receptor channel or the interior channel, according to an aspect of the disclosure.

FIG. 3 shows an extrusion, identical to FIGS. 1 and 2, but not having first screw boss 34 and second screw boss 42. The configuration of FIG. 3 may be suitable for a second story leeward side of a building. If additional protection is deemed useful, the window held by the configuration shown in FIG. 3 may carry glass that is more robust, such as "high impact" glass.

First lineal profile 20, second lineal profile 20', and third lineal profile 20" result from extrusions using dies that produce the specific profiles shown in FIGS. 1, 2, and 3, respectively. Portions of the exterior faces of the configurations of first lineal profile 20, second lineal profile 20' and third lineal profile 20" are partly aesthetic, namely those exterior and interior surfaces that are intended to be visible to those inside or outside the structure.

Between the exterior and interior surfaces of first lineal profile 20, second lineal profile 20', and third lineal profile 20" are functional feature designed to make first lineal profile 20, second lineal profile 20', and third lineal profile 20" more rigid with less material. Other aspects of the structure of first lineal profile 20, second lineal profile 20', and third lineal profile 20" are functional in that they are intended to hold to the wall of the structure, such as nail fin 30 or hold the glazing.

Figure 4:
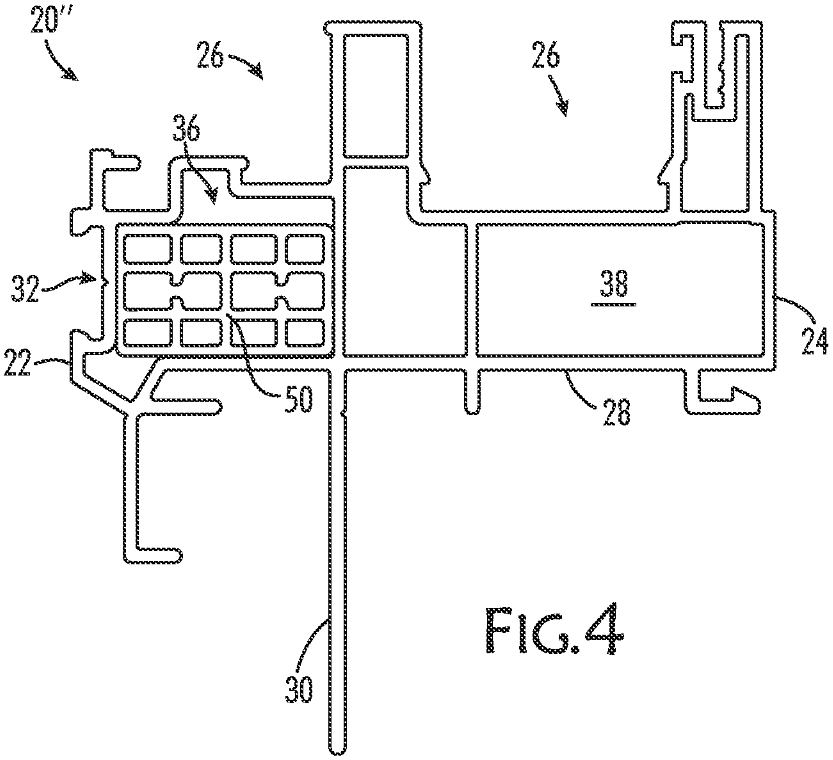
FIG. 4 illustrates the co-extruded lineal profile of FIG. 3, with a co-extruded screw boss inserted in the receiving channel, according to an aspect of the disclosure.
Figure 5:
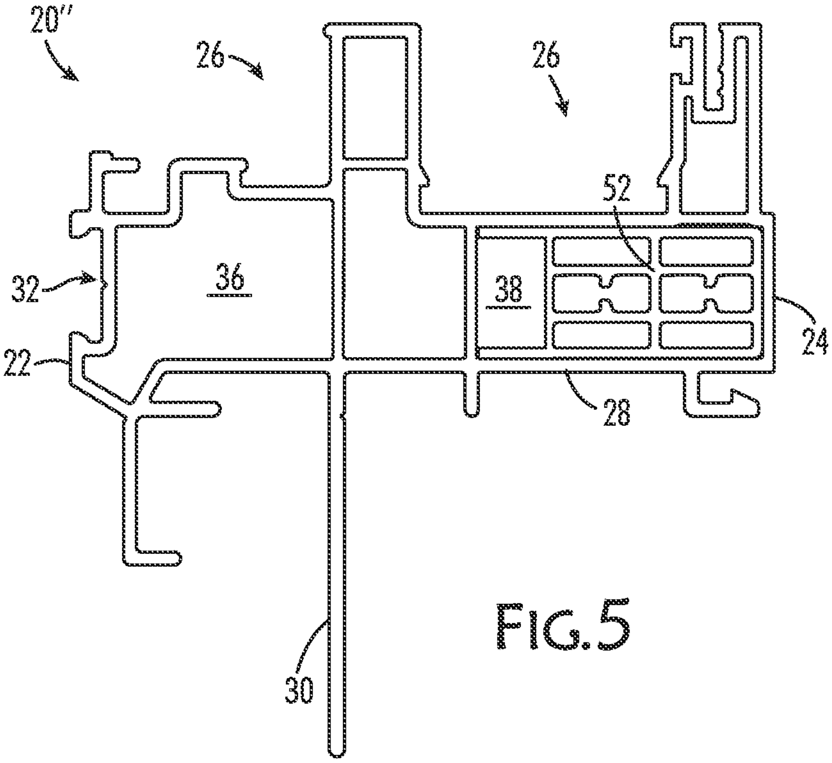
FIG. 5 illustrates the co-extruded lineal profile of FIG. 3, with a co-extruded screw boss has been inserted in the interior channel, according to an aspect of the disclosure.

FIGS. 4 and 5 replicate third lineal profile 20" as seen in FIG. 3. In FIG. 4, third extruded profile 20" includes an inserted screw boss 50 in receptor channel 36. In FIG. 5 third lineal profile 20" includes an inserted screw boss 52 in second channel 38, as opposed to having no screw bosses or co-extruded screw bosses with third profile 20" as illustrated in FIGS. 1 and 2.

Screw boss 50 and screw boss 52 are separately extruded as opposed to being co-extruded. The term "co-extruded" is used herein to mean that one die is used to form the profile and the screw boss, and contrasts with separate extrusion of profile and screw boss using separate extrusion dies.

Compare FIG. 4 with FIG. 1 and FIG. 5 with the right side of FIG. 2. After its separate extrusion, a length of screw boss 50 or of screw boss 52 is cut into sections having the appropriate lengths for the headers, sills, and jambs of a window frame, and then inserted into receptor channel 36 or into second channel 38 or both. The lengths of first screw boss 50 and second screw boss 52 are slid by pushing their cut ends into the designated receptor channel 36 or second channel 38, respectively, of any opposing two or four of the frame components (header, sill and jambs), either into receptor channel 36 or second channel 38 after they are cut and prior to assembly. The frame components are then joined to form rectangular window frames.

First screw boss 50 and second screw boss 52 are modified from first screw boss 34 and second screw boss 42. First screw boss 50 and second screw boss 52 may include additional structure in order to fill—or brace themselves—within the interior of receptor channel 36 or second channel 38, so that they remain in place during handling, assembly, storage, shipping and insertion of long screws. FIG. 4 shows first screw boss 50 inserted into an otherwise empty first channel. In FIG. 5, a second screw boss 52 is shown inserted into an otherwise empty second channel 38.

Thus, when multiple windows of a building may have different levels of window protection and yet look the same from the exterior, flexibility in providing that particular level for the windows can be achieved by the use of inserted screw bosses for specific windows. Some windows do not need impact resistant glass, and some windows do not need co-extruded internal and external screw bosses, so the ability to decide whether to add screw bosses as the windows are built enables considerable flexibility and economy in accommodating the individual needs for window protection.

Also, some components of a frame do not need to contain screw bosses. Inserting screw bosses in headers and sills uses shorter segments of screw bosses then when screw bosses are inserted in the jambs. This is a feature of the present disclosure. In addition to flexibility in choosing whether to insert screw bosses or not in any particular window frame, there is also the flexibility in determining if screw bosses are to be used in the header and sill of a frame rather than in the jambs, or in the jambs and not in the header and the sill.

In addition to windows and other framed openings, doors may also provide protection from damage from severe weather.

Figure 6A:
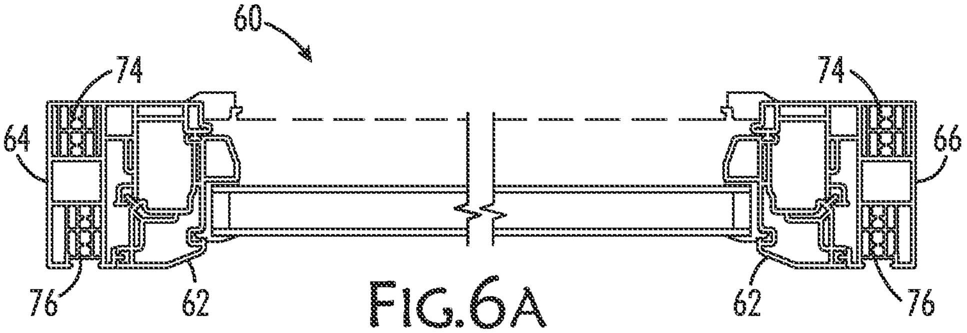
FIG. 6A illustrates a cross-section of a casement window in which the window frame includes co-extruded screw bosses in receptor channels on the exterior side of the frame and in also in interior channels of the frame, according to an aspect of the disclosure.
Figure 6B:
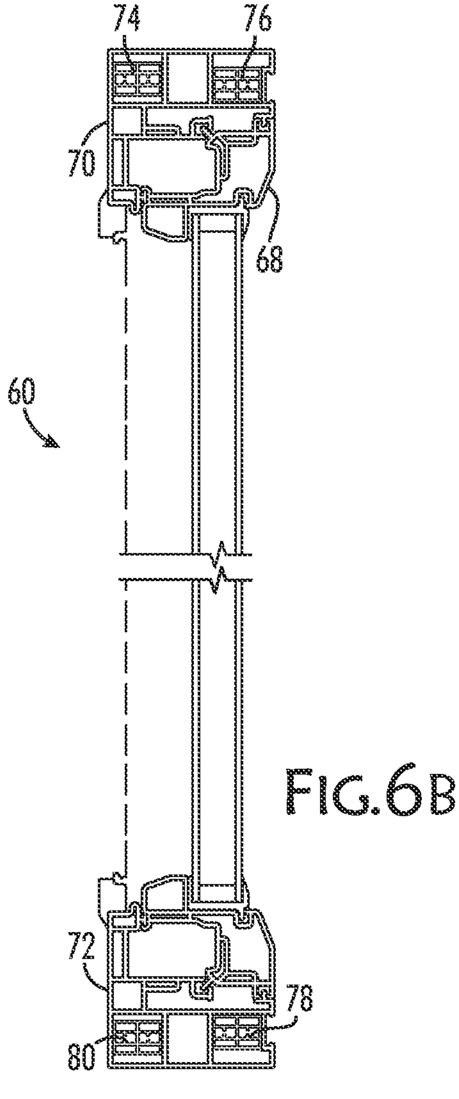
FIG. 6B illustrates a cross-section of a casement window in which the window frame includes inserted screw bosses in receptor channels on the exterior side of the frame and in also in interior channels of the frame, according to an aspect of the disclosure.

Referring now to FIGS. 6A, 6B, which show cross-sectional views of a casement window frame 60. FIG. 6A shows a horizontal cross-section 62 of casement window frame 60 with its left and right jambs 64, 66, respectively, on the extreme left and right. FIG. 6B shows a vertical cross-section 68 of casement window frame 60 with its header 70 at the top of the illustration and sill 72 at the bottom.

Horizontal cross-section 62 (FIG. 6A) includes co-extruded interior and exterior screw bosses 74, 76, respectively, at the ends of casement window frame 60 as see in FIG. 6A. In FIG. 6B, inserted interior screw boss 78 and inserted exterior screw bosses 80, respectively, are shown at the top and bottom of FIG. 6B.

A variation of the use of co-extruded and inserted screw bosses enables application of the present disclosure to "astragal" bi-directional, sliding glass doors in order to enable them to receive protective panels. Two versions of astragal closures are illustrated in cross-sectional drawings of FIGS. 7A, 7B, 7C and 7D. The first versions or configurations of astragals illustrating the teachings of the present disclosure are illustrated in FIGS. 7A and 7C, which configurations generally referred to in the art as the "Pacific" version; the second configuration, illustrated in FIG. 7B and FIG. 7D, is generally referred to in the art as the "Atlantic" version.

Figure 7A:
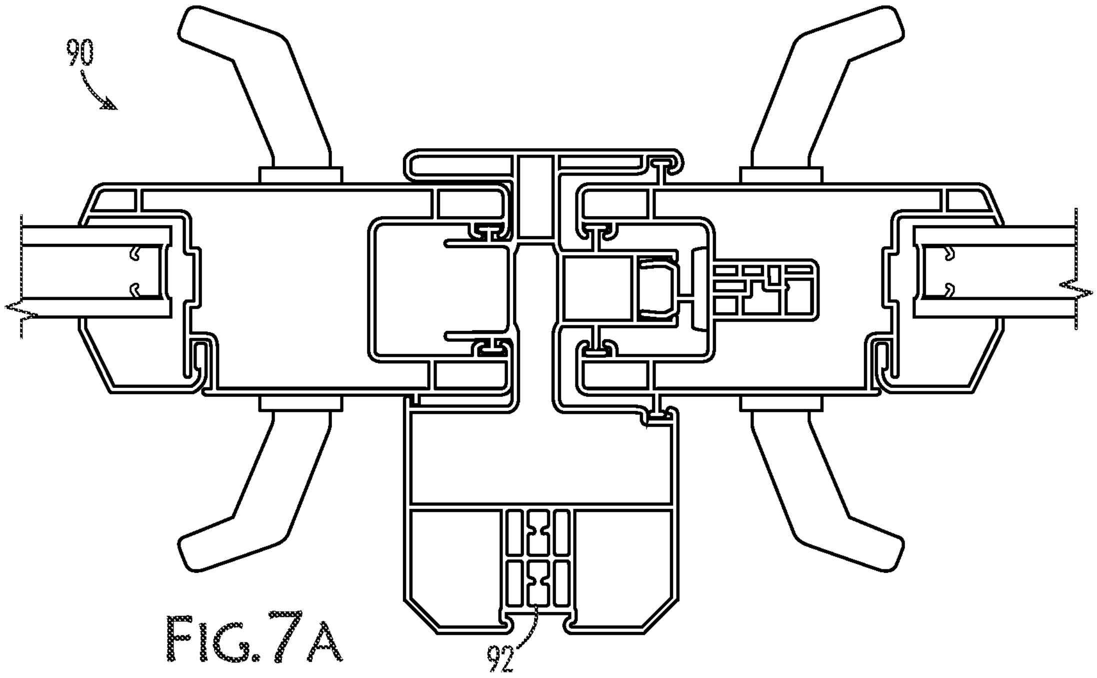
FIGS. 7A and 7B illustrate a "Pacific" and an "Atlantic" configuration of an astragal door, respectively, which configurations having a screw boss extruded into the receiving channel, according to an aspect of the disclosure.

FIG. 7A shows a first Pacific version of an astragal 90 with a co-extruded screw boss 92; FIG. 7B shows of a second Pacific version of an astragal 94 with an inserted screw boss 96.

Figure 7B:
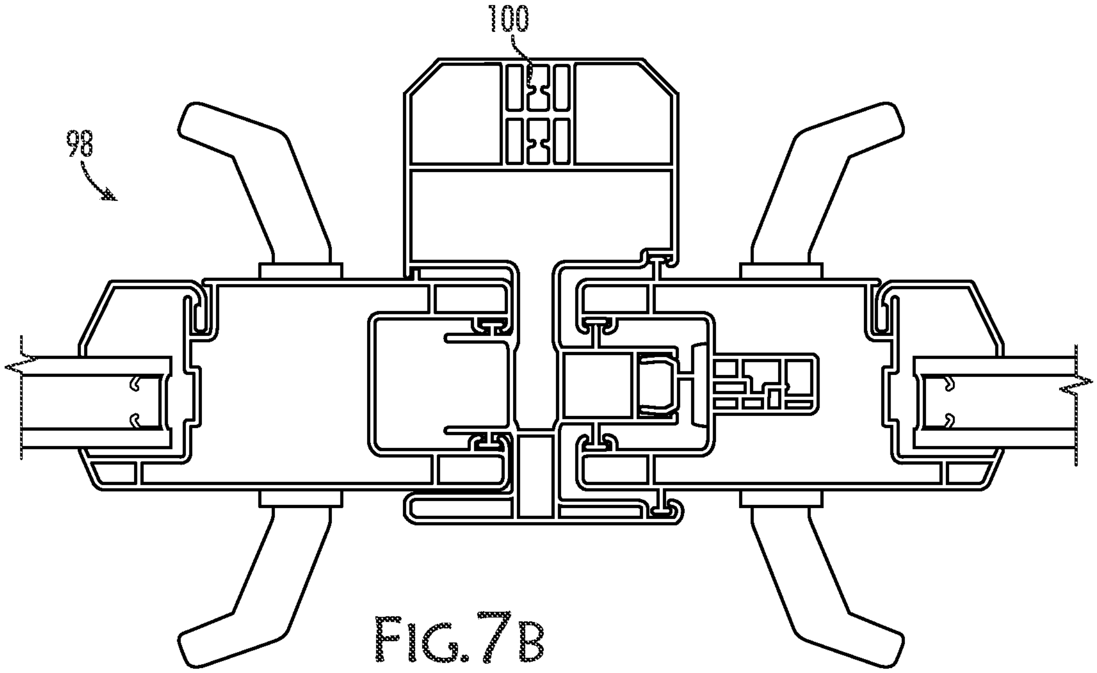

FIG. 7B shows a first Atlantic version of an astragal 98 with a co-extruded screw boss 100; FIG. 7D shows of a second Atlantic version of an astragal 102 with an inserted screw boss 104.

Figure 7C:
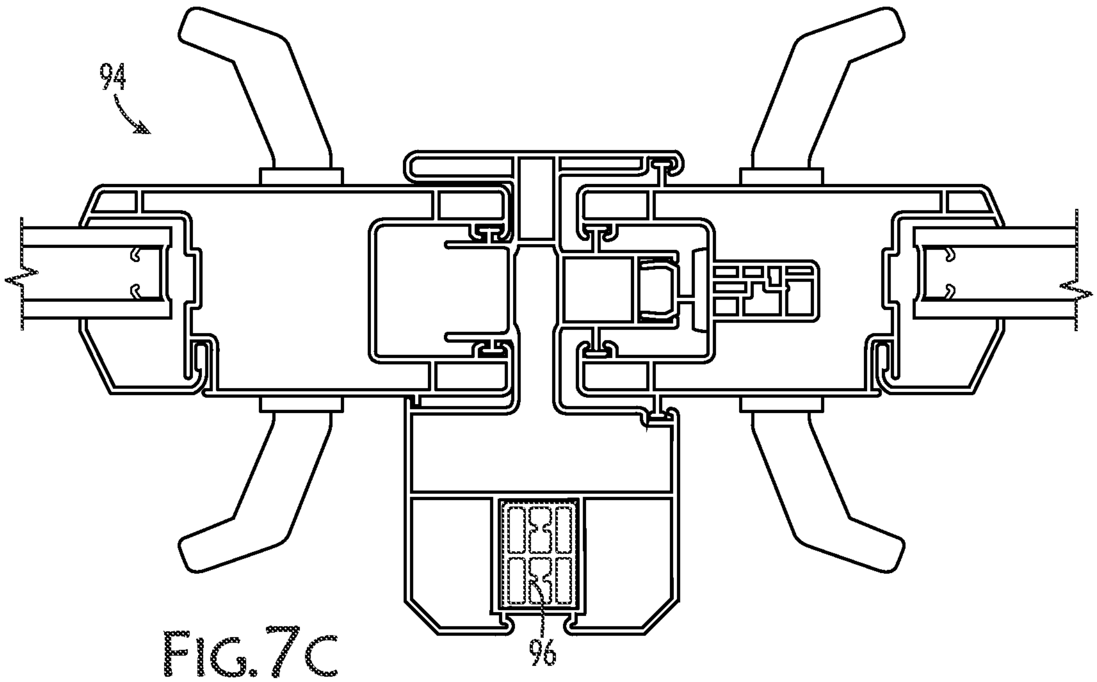
FIGS. 7C and 7D illustrate a "Pacific" and an "Atlantic" configuration of an astragal door, respectively, which configurations having an inserted screw boss in the receiving channel, according to an aspect of the disclosure.
Figure 7D:
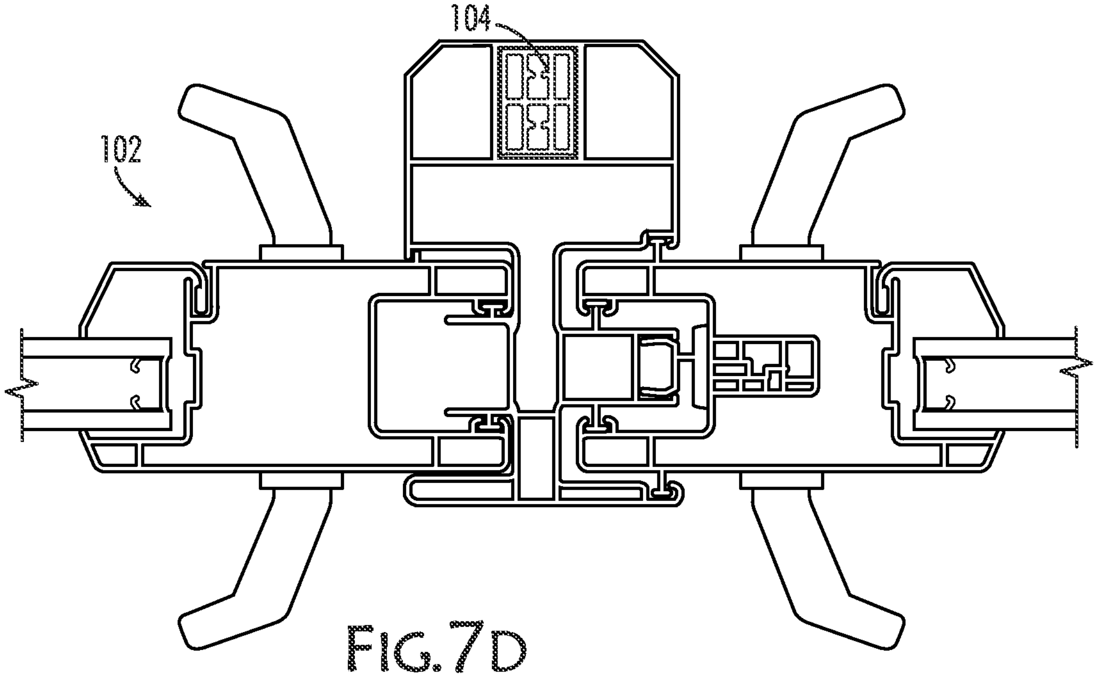

FIG. 7A and FIG. 7C are identical except that FIG. 7A has screw boss 92 co-extruded with the door post and FIG. 7C has an inserted screw boss 96. FIG. 7B and FIG. 7D are also identical, and FIG. 7B has a co-extruded screw boss 100 whereas FIG. 7D has an inserted screw boss 104.

Figure 8A:
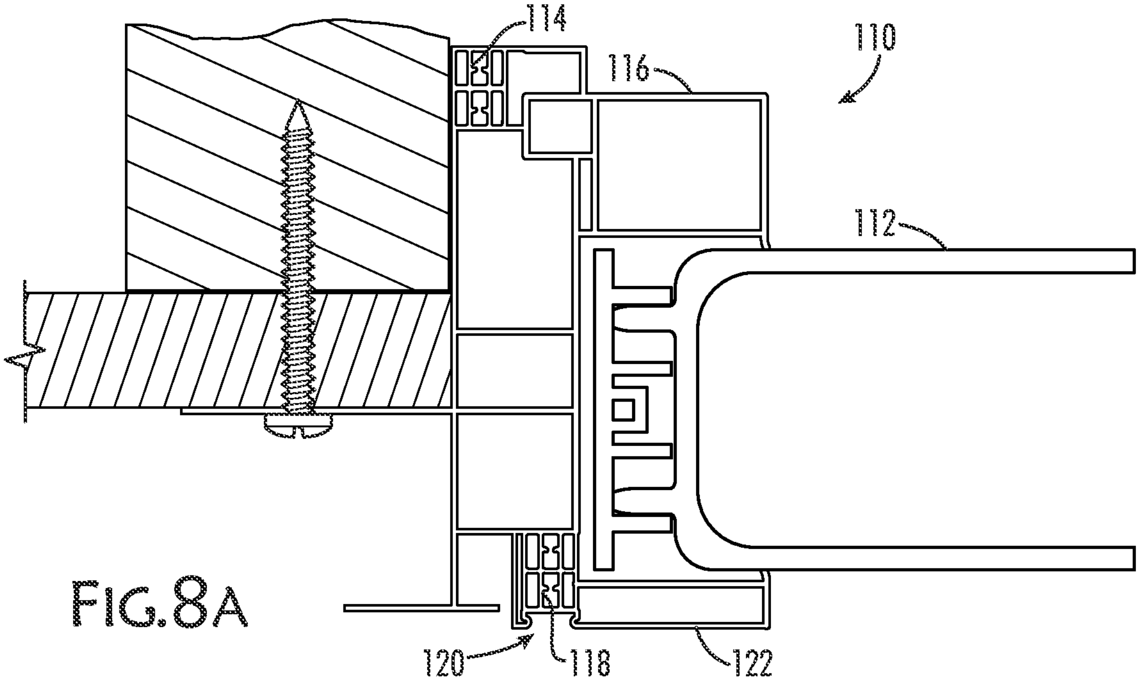
FIG. 8A illustrates a frame for a glass block window having an extruded screw boss in the receptor channel on the exterior side of the frame and in an extruded screw boss in an interior channel on the interior side of the frame, according to an aspect of the disclosure.

The present lineal screw boss extrusion, made either as part of a larger lineal or made separately and inserted after the fact, can also be adapted for use with glass block windows. FIG. 8A illustrates a frame 110 for a window 112 made of glass blocks, which are a glass architectural element that obscures the view through the glass but admits light. Frame 110 has a first screw boss 114 in the interior side 116 of frame 110 and a second screw boss 118 in a receptor channel 120 on the exterior side 122 of frame 110.

Figure 8B:
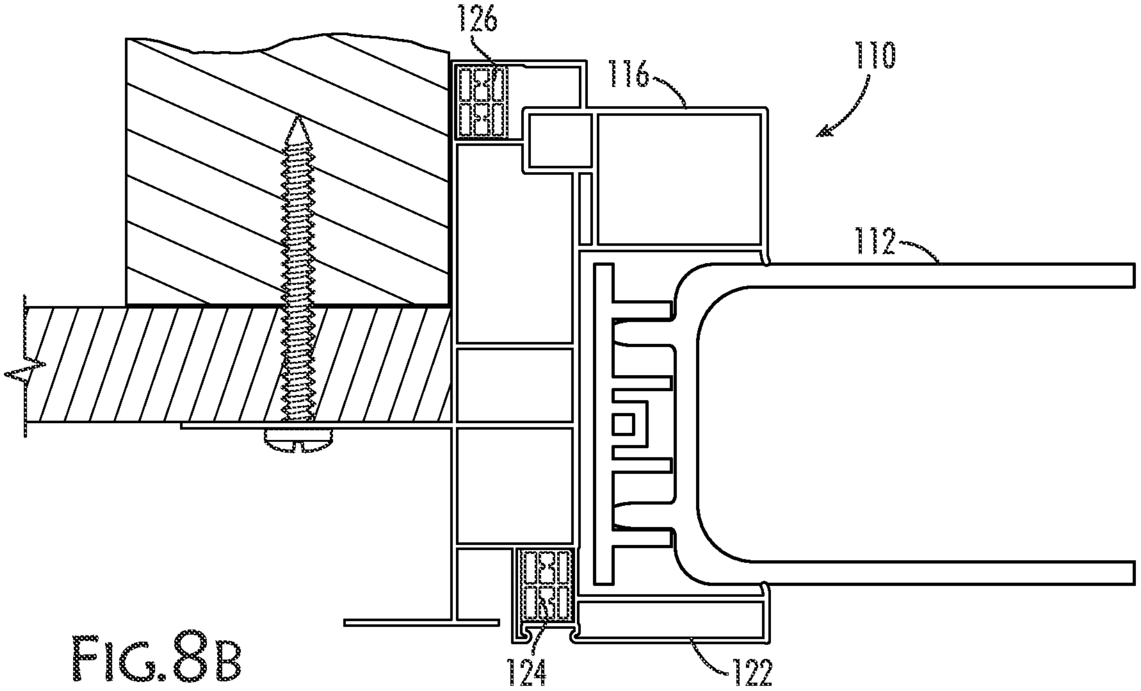
FIG. 8B illustrates the frame for the glass block window of FIG. 8A, with a screw boss inserted in the receptor channel on the exterior side of the frame and another screw boss inserted into a channel the interior side of the frame, according to an aspect of the disclosure.

FIG. 8B illustrates frame 110 for window 112 of FIG. 8A, made of glass blocks, with a first screw boss 124 inserted in the exterior side 122 of frame 110 and a second screw boss 126 inserted on the interior side 116 of frame 110.

Figure 9A:
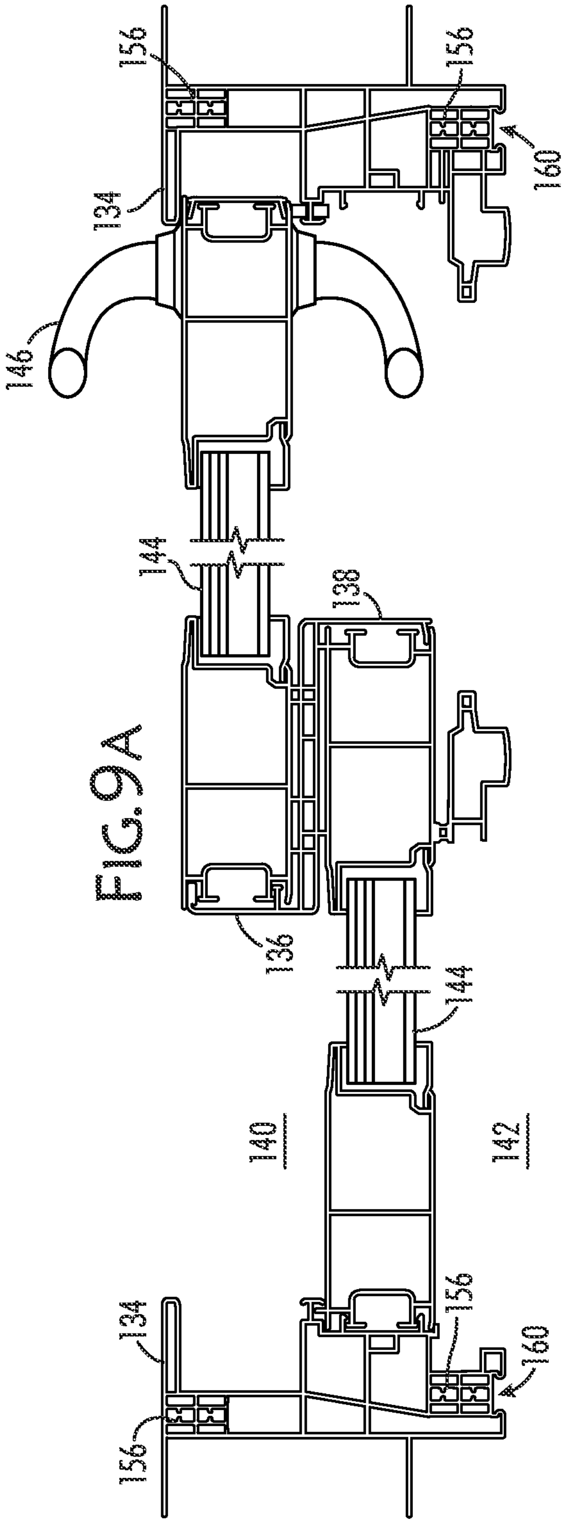
FIG. 9A illustrates an example of a frame for a sliding door, with a first extruded screw boss in a receptor channel on the exterior side of the ends of the frame and a second extruded screw boss in the interior side of the ends of the frame, according to an aspect of the disclosure.

FIG. 9A illustrates another example, namely, a horizontal cross section of a frame 134 holding a sliding glass door 136 and a fixed door 138. Frame 134 holds glazing 144 for sliding door 136 and sliding door 138. Frame 134 includes second co-extruded screw boss 156 on interior side 140 and frame and a co-extruded screw boss 160 on the exterior side.

Figure 9B:
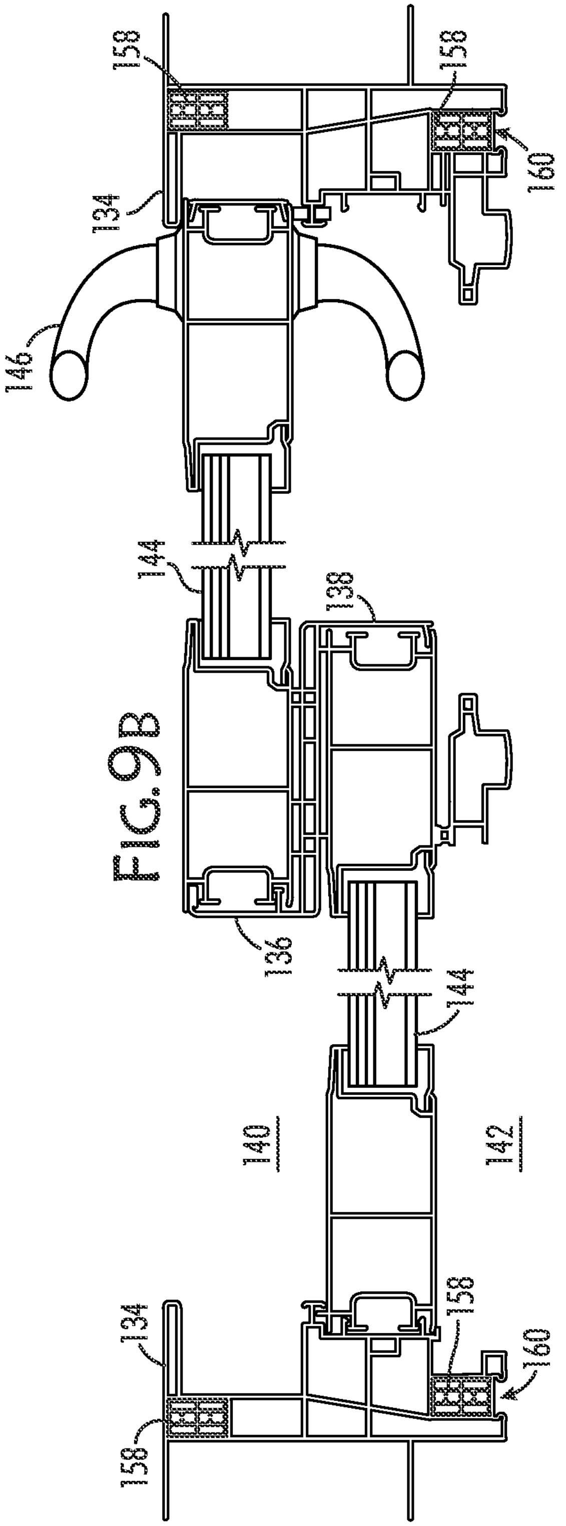
FIG. 9B illustrates an example of a frame for sliding door, with a first inserted screw boss in a receptor channel on the exterior sides of both ends of the frame and a second inserted screw boss in the interior sides of the ends of the frame, according to an aspect of the disclosure.

FIG. 9B is otherwise identical to FIG. 9A except that frame 134 holds inserted second co-extruded screw boss 156 and co-extruded screw boss 160 on the interior and exterior, respectively.

Sliding door 136 moves and a fixed door 138 that does not slide or otherwise move are confined in frame 134. Sliding door 136 has door handles 146 for opening sliding door 136.

Sliding door 136 includes its own frame 148; fixed door 138 also includes its own frame 150. Glazing 144 in sliding door 136 and fixed door 138 defines the boundary between the interior side 140 and the exterior side 142 of sliding door 136.

In FIG. 9A, in the interior side 140, a second co-extruded screw boss 156 is shown co-extruded as part of frame 134 of fixed door 138 in the receptor channel on the exterior side 142 of frame 134, and second co-extruded screw boss 156 is located in the interior side of door frame 134. FIG. 9B illustrates a similar configuration for sliding door 138 with a screw boss inserted into a receptor channel on the exterior side of the frame of the door and another screw boss inserted into the frame on the interior side of the open frame.

Figure 10A:
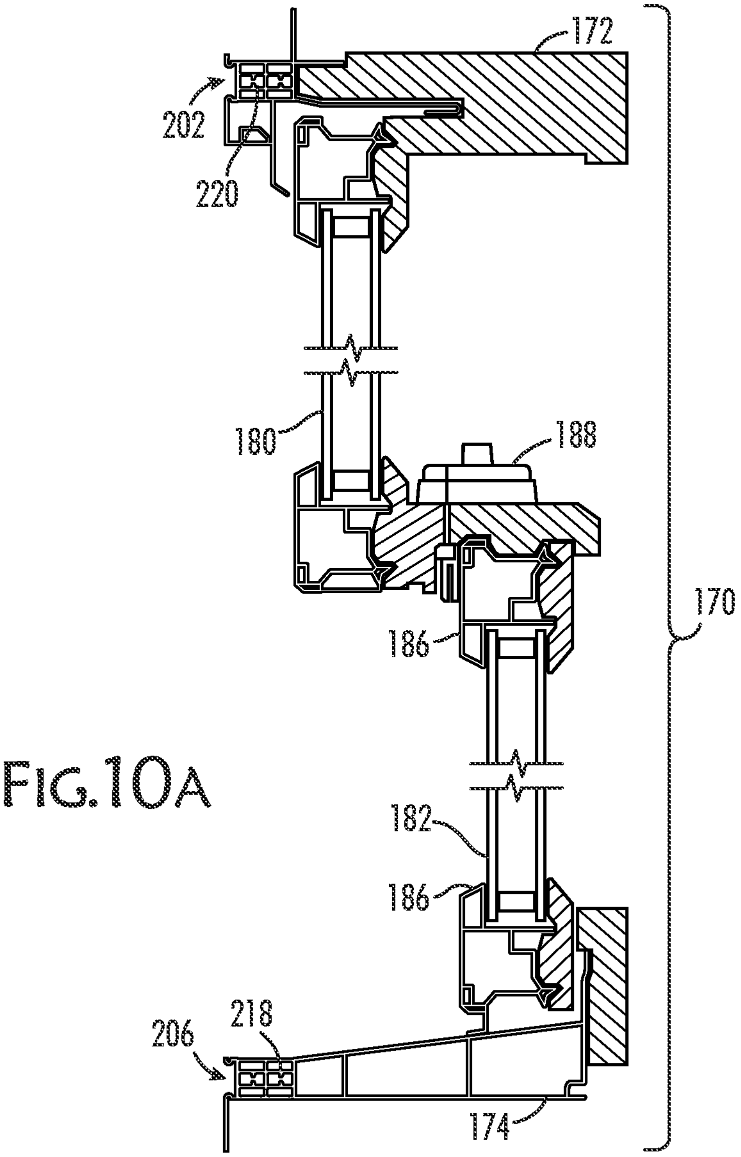
FIGS. 10A and 10B illustrates, in FIG. 10A, a partially cutaway view of a double-hung window in which an extruded screw boss is in the receiving channels of the head and the sill, and, in FIG. 10B, a partially cutaway view of the double hung window in which an extruded screw boss is in the receiving channels of left and right jambs, according to an aspect of the disclosure.
Figure 10B:
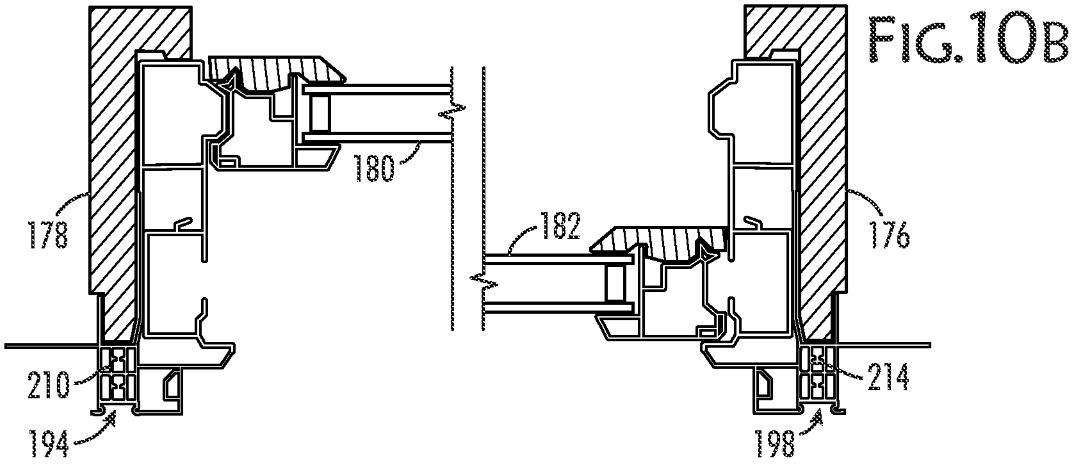

FIGS. 10A, 10B, show a double-hung window 170 in cross-section, first, in FIG. 10A, through header 172 and, second, in FIG. 10B, through sill 174, and a cross-section through the left and right jams. FIGS. 11A, 11B, 12A, 12B, and 13A and 13B replicate FIGS. 10A and 10B of double hung window 170 in the same two cross-sectional views as FIGS. 10A and 10B. The AB figure pairs of drawings have different combinations of co-extruded or inserted or no screw boss. To simplify the understanding of FIGS. 10A/10B, 11A/11B, 12A/12B, and 13A/13B, reference numbers used for a structure in one drawing are used in the drawings when the same structure appears.

Window 170 is a double-hung window, as seen in FIGS. 10A and 10B, has a header 172 and a sill 174. Header 172 and sill 174 include upper and lower receptor channels 202 and 206, respectively. Upper receptor channel 202 includes a co-extruded screw boss 220; lower receptor channel 206 also includes a co-extruded screw boss 218. A panel (not shown) may be attached to window 170 using screws (not shown) driven into through the panel and into upper screw boss 220 and into lower screw boss 218. Upper screw boss 220 and lower screw boss 218 will hold penal securely to window 170 in the event of severe weather.

In FIG. 10B, the inside of window 170 is at the top and the outside of window 170 is at the bottom. Right jamb 176 and left jamb 178 are on the opposing sides of lower window glazing 180 and upper window glazing 182 where left receptor channel 194 runs vertically on one side of window 170 and right receptor channel 198 runs vertically on the other side of window 170. A co-extruded screw boss 210 is located in left receptor channel 194 and another co-extruded screw boss 214 is located in right receptor channel 198. Just as a panel may be attached to co-extrude screw boss 218 and 220 in FIG. 10A, so, too can a panel—including the same panel, be attached to right jamb 176 and left jam 178.

In FIG. 10B, the receptor channels in the upper two figures do not contain screw bosses. However, the header and sill of the lowest figure of 10B does have screw bosses in its receptor channels. Accordingly, a panel or covering can be attached to the window across the header and the sill. It is not attached to the left and right jambs.

In FIG. 10C, the arrangement is very similar to that of 10B. However, the receptor channels do not have co-extruded screw bosses. They have inserted screw bosses.

Finally, in FIG. 10D, none of the receptor channels includes a screw boss. The window of FIG. 10D may be protected by installing impact resistant glass.

Figure 11A:
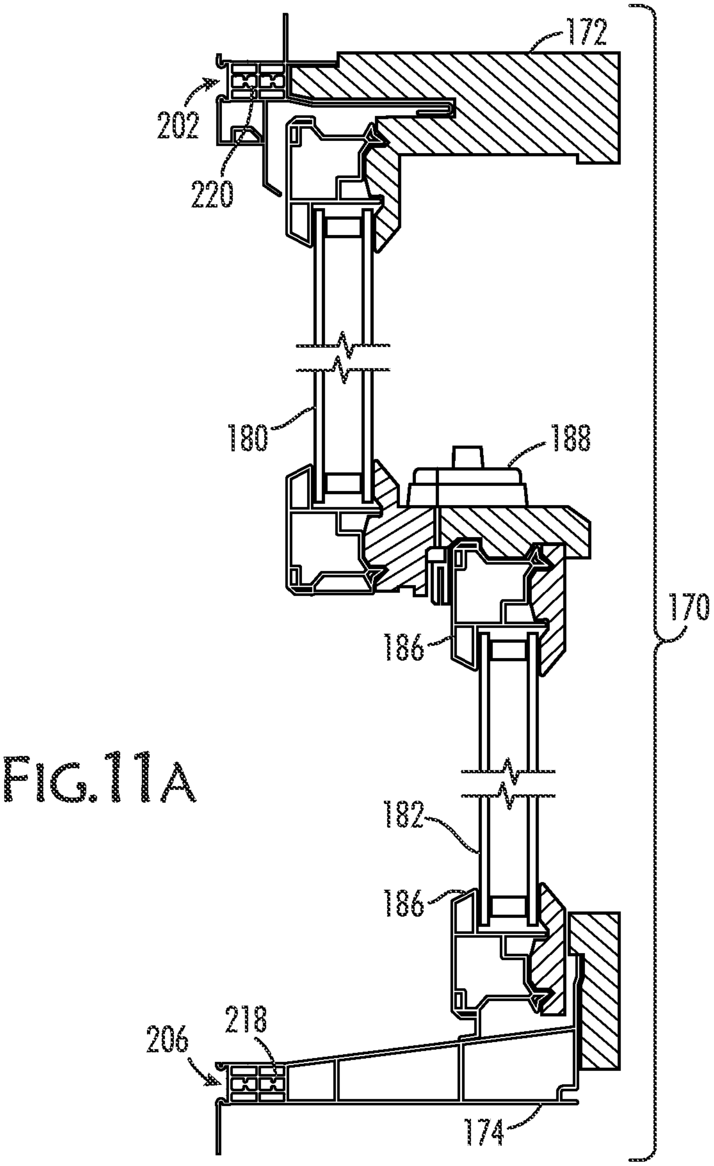
FIGS. 11A and 11B illustrates, in FIG. 11A, a partially cutaway view of a double-hung window in which an extruded screw boss is in the receiving channels of the head and the sill, and, in FIG. 11B, a partially cutaway view of the double hung window in which no screw boss is in the receiving channels of either left or right jambs, according to an aspect of the disclosure.
Figure 11B:
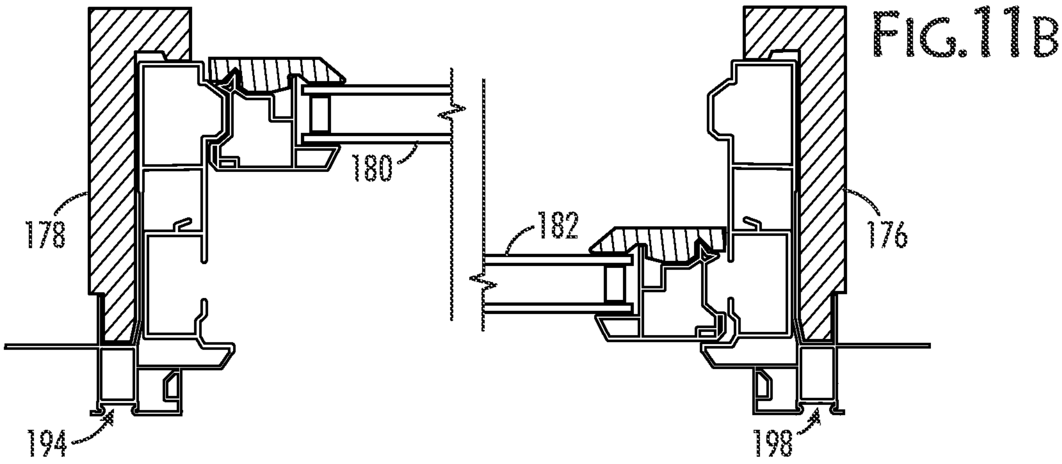
Figure 12A:
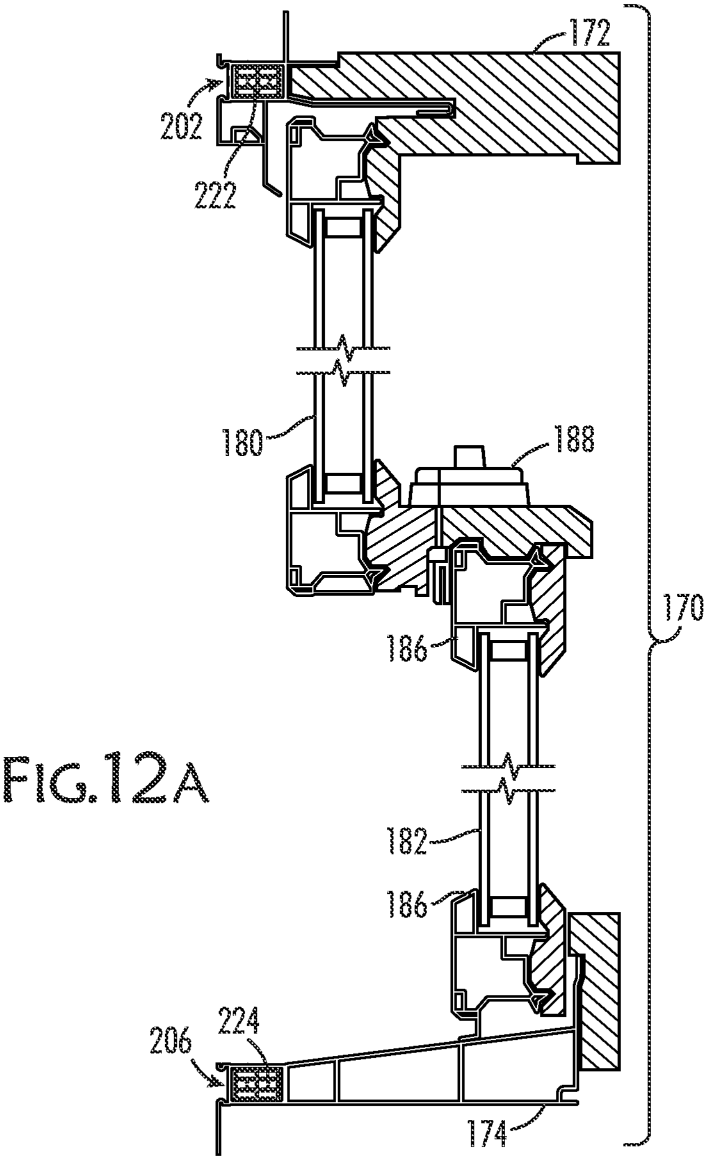
FIGS. 12A and 12B illustrates, in FIG. 12A, a partially cutaway view of a double-hung window in which an inserted screw boss is in the receiving channels of the head and the sill, and, in FIG. 12B, a partially cutaway view of the double hung window in which no extruded screw boss is in either receiving channels of left or right jambs, according to an aspect of the disclosure.
Figure 12B:
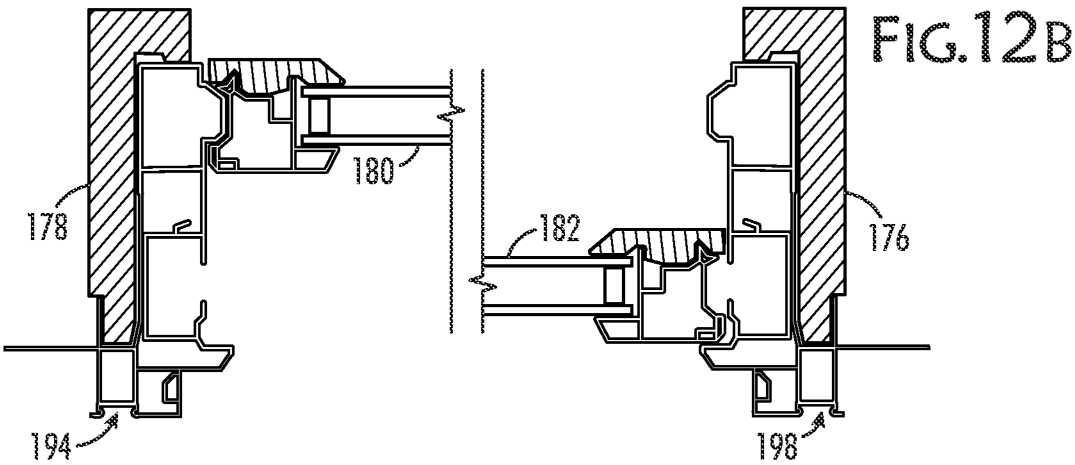

FIGS. 11A and 11B are identical in almost every respect to FIGS. 10A and 10B, respectively, except that there is no screw boss in either left receptor channel 194 or right receptor channel 214. Left receptor channel 194 and right receptor channel 214 are FIG. 12A and FIG. 12B are also nearly identical to FIGS. 10A and 10B except that screw boss 220 in header 172 in FIG. 10A is not a co-extruded screw boss. It is an inserted screw boss 222, and screw boss 218 is also not and inserted screw boss. It is a co-extruded screw boss 224. Left and right receptor channels are, as in the case of FIG. 11B, empty.

Figure 13A:
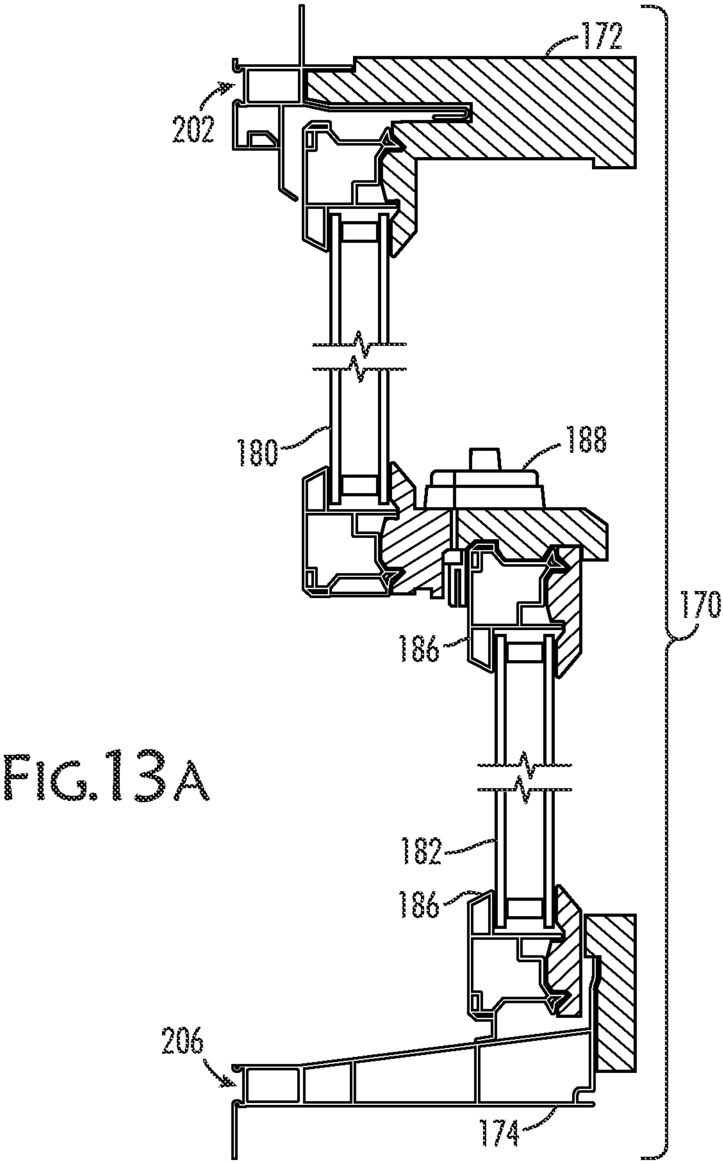
FIGS. 13A and 13B illustrates, in FIG. 13A, a partially cutaway view of a double-hung window in which an inserted screw boss is in the receiving channels of the head and the sill, and, in FIG. 13B, a partially cutaway view of the double hung window in which no screw boss is in the receiving channels of either left or right jambs, according to an aspect of the disclosure.
Figure 13B:
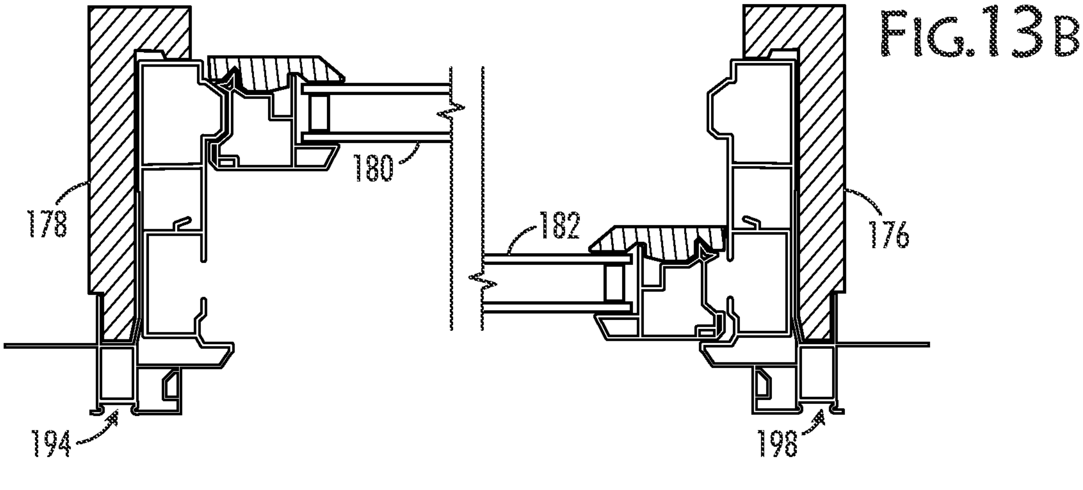

FIGS. 13A and 13B have no screw bosses in header receptor channel 202, sill receptor channel 206 channel, left receptor channel 194 or right receptor channel 198.

Finally, as shown in FIG. 13A, bottom illustration, there is an upper (left end) and lower (right end) receptor channel that contain a coco-extruded screw boss, indicating that across the top and bottom of the window, a panel or covering can be attached using fasteners.

Figure 14A:
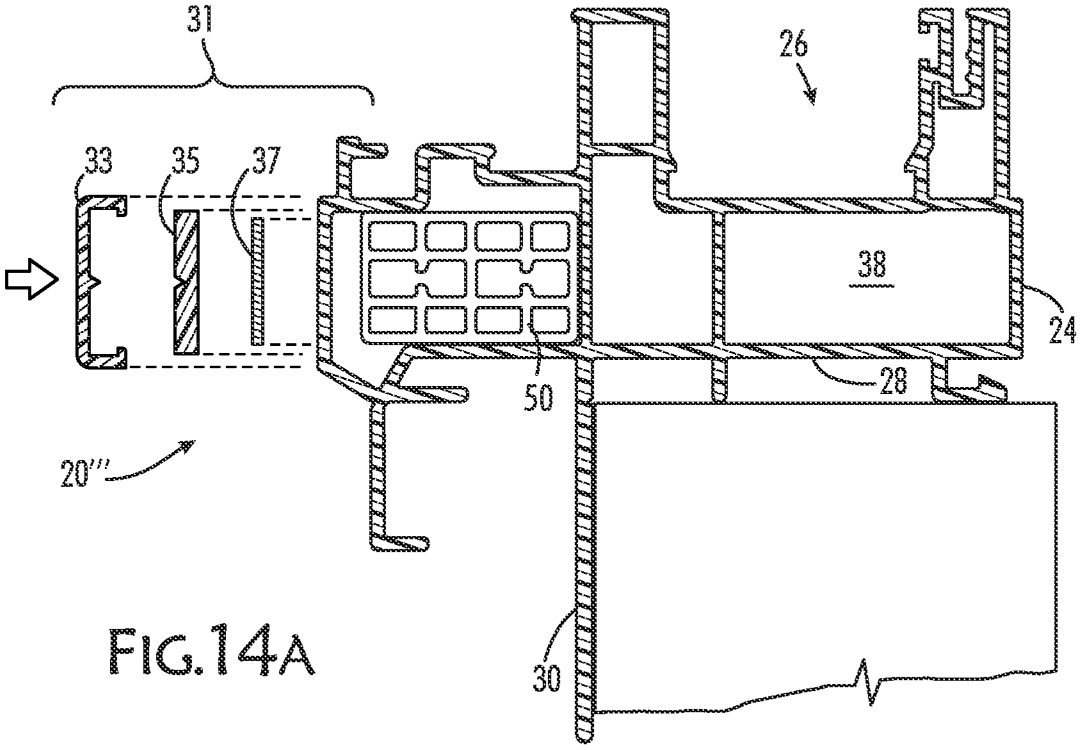
FIGS. 14A and 14B illustrate, in FIG. 14A, an example extruded lineal with a screw boss, along with an exploded view of a storm track comprising a storm cap, a storm stanchion, and a storm attachment layer.
Figure 14B:
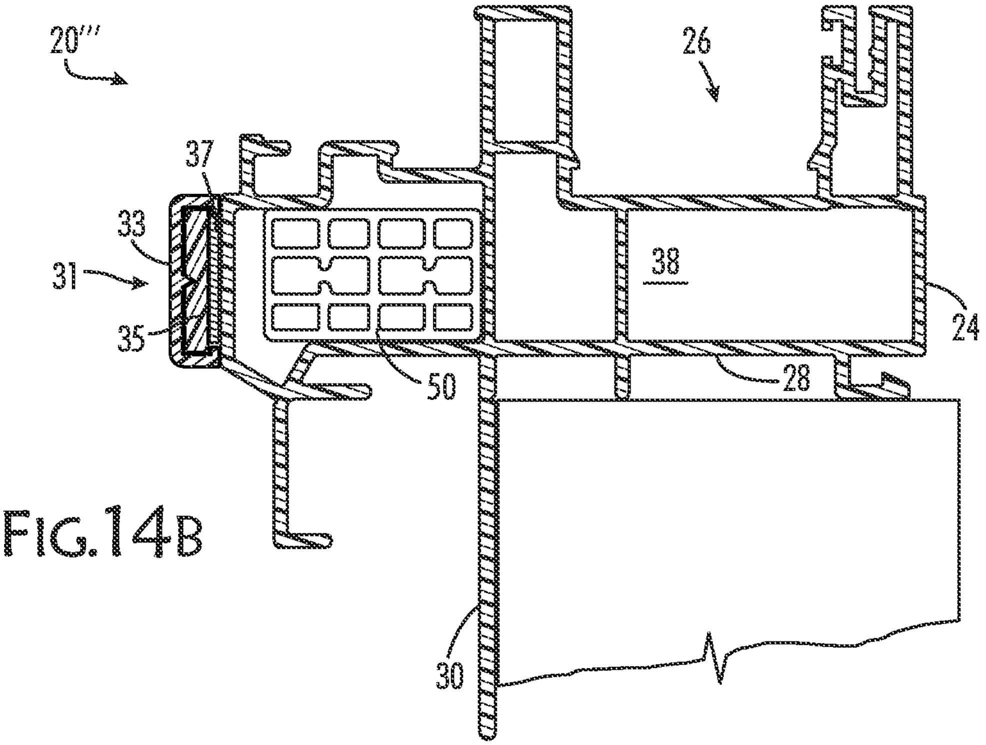

FIGS. 14A and 14B illustrate, in FIG. 14A, an example co-extruded lineal with a screw boss, along with an exploded view of a storm track comprising a storm cap, a storm stanchion, and a storm attachment layer; in FIG. 14B, an example co-extruded lineal of FIG. 14A with a configured storm track comprising a storm cap, a storm stanchion, and a storm attachment layer.

In one aspect, a lineal may be co-extruded, in another it may be extruded and taking the form as identified in any of the previous embodiments, including the embodiments FIG. 14A-B. In said aspect, a storm track or otherwise known as a track may be applied on a side of the lineal opposite the side of a building. In this aspect the storm track serves as a mounting point for a storm panel such as a screen, plywood, or metal that provides resistance to the impact of storm damage, such as high winds and debris. The storm track 31 may be comprised of a cap 33, a stanchion 35, and an attachment layer 37. In one aspect the storm track 31 is configured to attach to a lineal, such as a jamb, a header, or a sill, as disclosed in FIG. 14A. The lineal configured with a screw boss 50, wherein the screw boss may be coextruded to form a single unit or inserted as an insert-able screw boss. In the example, the receptor channel 36 either receives the screw boss 50 as an insert-able, or the receptor channel 36 has a screw boss internally formed—through extrusion or co-extrusion for compounding thermal plastics. Further, in the example a second channel 38 allows for a second screw boss to be inserted or formed for an additional attachment point for longer or extended fasteners.

Continuing, in the example of FIG. 14A, the storm track 31 is shown exploded and in pre-installation, wherein when installing or otherwise utilizing the attachment layer 37 is placed on the front edge of the lineal, and attached thereto is the stanchion 35 that identifies insertion points for the fasteners so as to properly align fasteners with the screw boss 50. The storm track 31 further comprises a storm cap or cap 33, the cap 33 is utilized to cover or hide the stanchion 35 and provides a customizable way to apply a storm panel or protection panel by removing the cap and inserting fasteners into the stanchion locations through the screw boss. When the storm or turbulent weather subsides, the panel may be removed and the cap replaced in order to provide a consistent appearance that hides the insertion points for storm panels. In one aspect, the disclosure herein provides for a decorative storm panel kit that provides support for attaching storm prevention panels, while also providing a uniform look that covers or otherwise hides fastener points and other hardware that would otherwise not form a uniform appearance.

Turning now to FIG. 14B, disclosing an assembled storm track 31, wherein the cap 33 is attached to the stanchion 35, which is in turn attached by the attachment layer 37 to the lineal. The attachment layer 37 may be double sided tape, an adhesive, or a compound that provides adhesion between the lineal wall and the stanchion. Such attachment layer 37 is replaceable should it wear without requiring additional components (stanchion, cap). Further, the attachment layer 37 should be able to withstand outdoor environments and provide for strong adhesion between the lineal and the stanchion.

Continuing, in FIG. 14B, the assembled storm track provides a customizable visual appearance that hides the stanchion 33 and the fastener locations, appearing as a track or rail on the exterior that remains uniform. When deploying a storm panel, the cap 33 separates (unhooks, removes, unclips) from the stanchion 35 based on a connection point(s), such as a lip forming a mechanical connection, or a chemical connection such as additional adhesive layers, or any combination thereof. In one aspect, once the cap 33 is removed, the stanchion 35 is revealed with a fastener location identifying the location of the screw boss 50. In other aspects a visual identification or a physical identification may be placed on the stanchion, identifying the location of the screw boss in the receptacle.

Figure 15A:
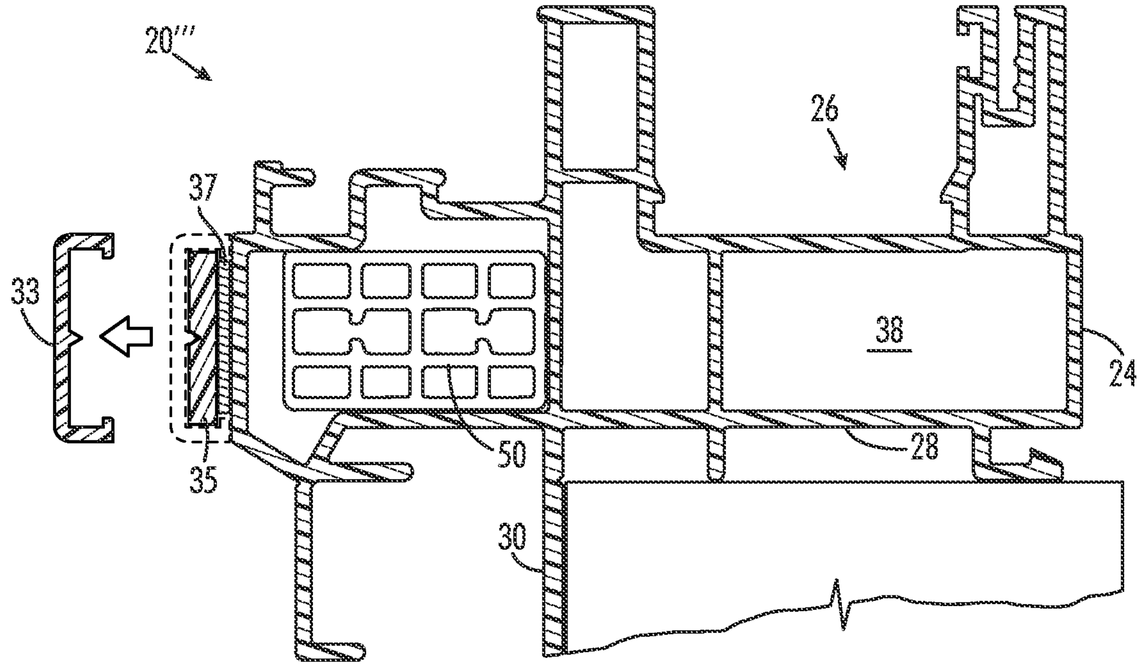
FIGS. 15A and 15B illustrates the method of use of an example installed storm track on an extruded lineal with a screw boss, in FIG. 15A, removal of the storm cap grants access to the storm stanchion, in FIG. 15B, application of a storm panel such as plywood through the storm track is disclosed.
Figure 15B:
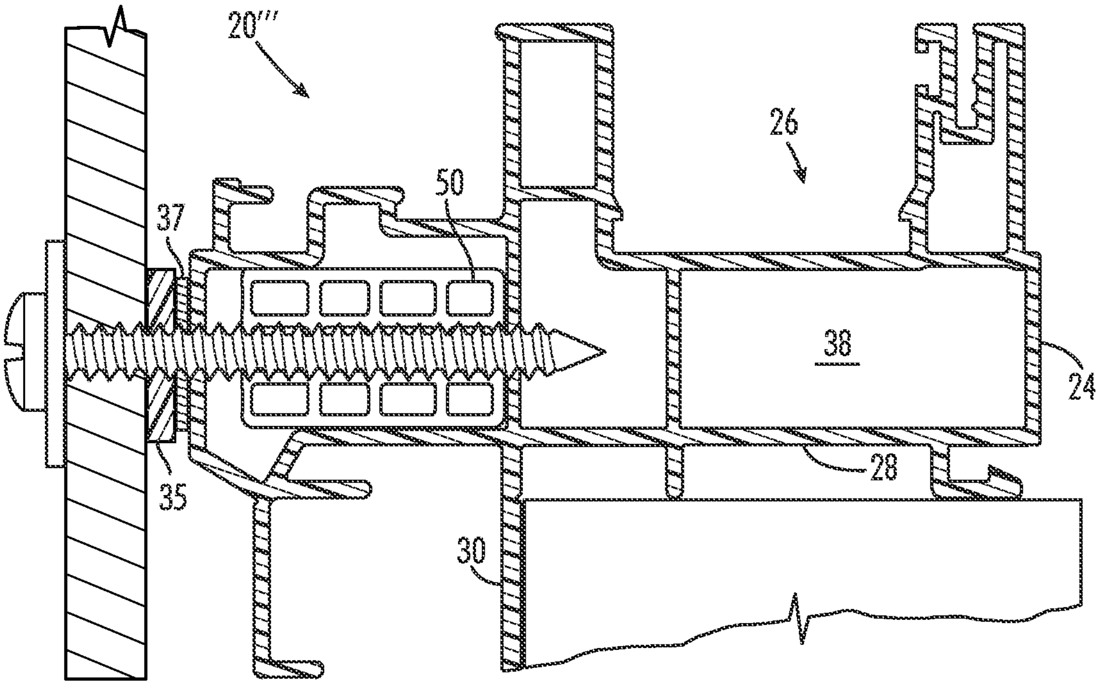

In FIGS. 15A and 15B illustrate the method of use of an example installed storm track on a co-extruded lineal with a screw boss, in FIG. 15A, removal of the storm cap grants access to the storm stanchion, in FIG. 15B, application of a storm panel such as plywood through the storm track is disclosed. In the example of FIG. 15A, the storm track is displayed with the cap 33 being removed for installation of a panel for protecting the glazing from high winds and debris. In the example an arrow indicates the cap 33 removal, leaving the stanchion 35 with the fastener indication points for inserting fasteners into the screw boss 50. In the example, an attachment layer 37 holds the storm trim firmly to the outward face of the lineal, while the linear is secured through a nail fin 30 to a wall of a building. In one aspect, a glazing is held in the recess 26, and protected by a panel installed with a fastener through the stanchion 35, the attachment layer 37, and the screw boss 50. In another aspect, a window or door may be installed with the lineal provided in any of the previous embodiments, wherein the lineal is configured with a screw boss and attachment points for the application of a storm cover system, assembly, or kit that allows for decorative appeal, while also concealing the fastener locations. In the example, the cap may match or otherwise be designed for the particular lineal, to allow a seamless blending of the attachment points for a storm panel.

Turning to FIG. 15B, a fastener is depicted holding a panel in place and piercing the stanchion 35 and the attachment layer 37 (adhesive, adhesive tape, etc.), making a connection with the screw boss 50 to provide high wind resistance and support. In one aspect, the second receptacle 38 may include an additional screw boss, allowing for elongated fasteners and additional support for extreme weather events and high winds. In one aspect, the frame recess 26 holds the glazing and the panel configured to the storm trim prevents damage to the glazing by providing sheathing or protection against the same.

The lineal disclosed in the embodiments in FIGS. 14A-B and FIGS. 15A-B may form a first jamb, a second jamb, a header, and a sill, which in turn, when configured together, form a frame. The forms may take different design embodiments as disclosed herein, and the function may relate to the placement. The frame may be a window or door frame, or other frame for an opening in a building. Further, said frame may be comprised from an extruded polymeric material or co-extruded polymeric material, and may further include additives for rigidity and support. Additionally, the screw boss referred to herein may be inserted or may be extruded, co-extruded, or otherwise formed with the lineal, and similarly, the storm track may have implementations that are extruded with or attached to the lineal.

Figure 16A:
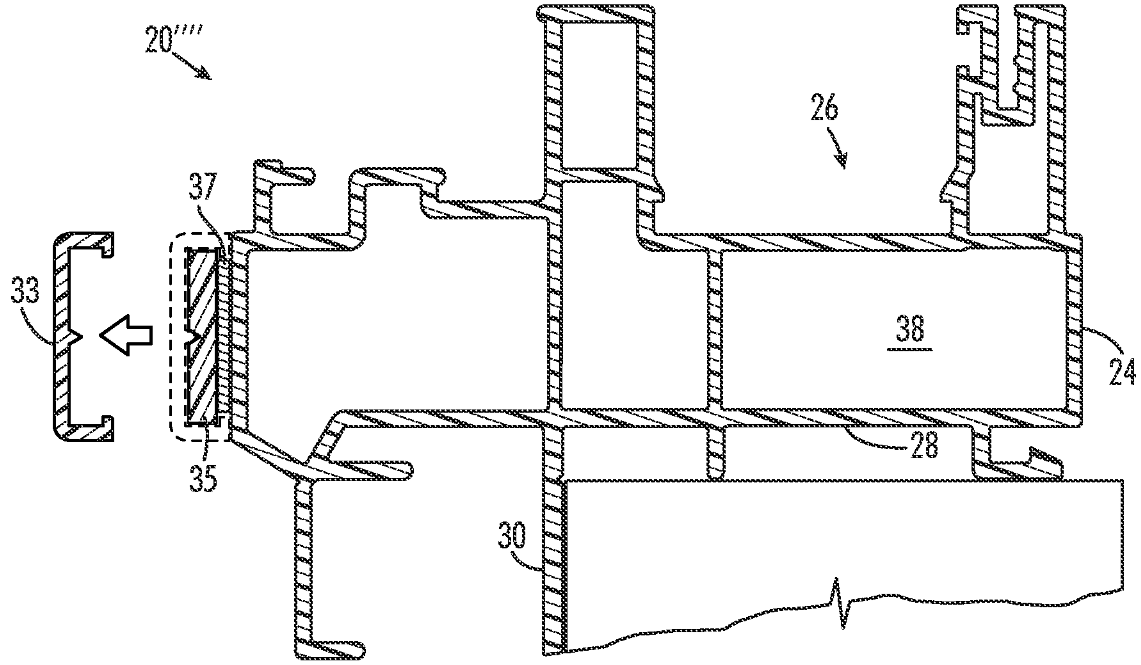
FIGS. 16A and 16B include further embodiments without a screw boss, wherein the lineal walls serve as the method of attachment for the fastener through the storm trim.
Figure 16B:
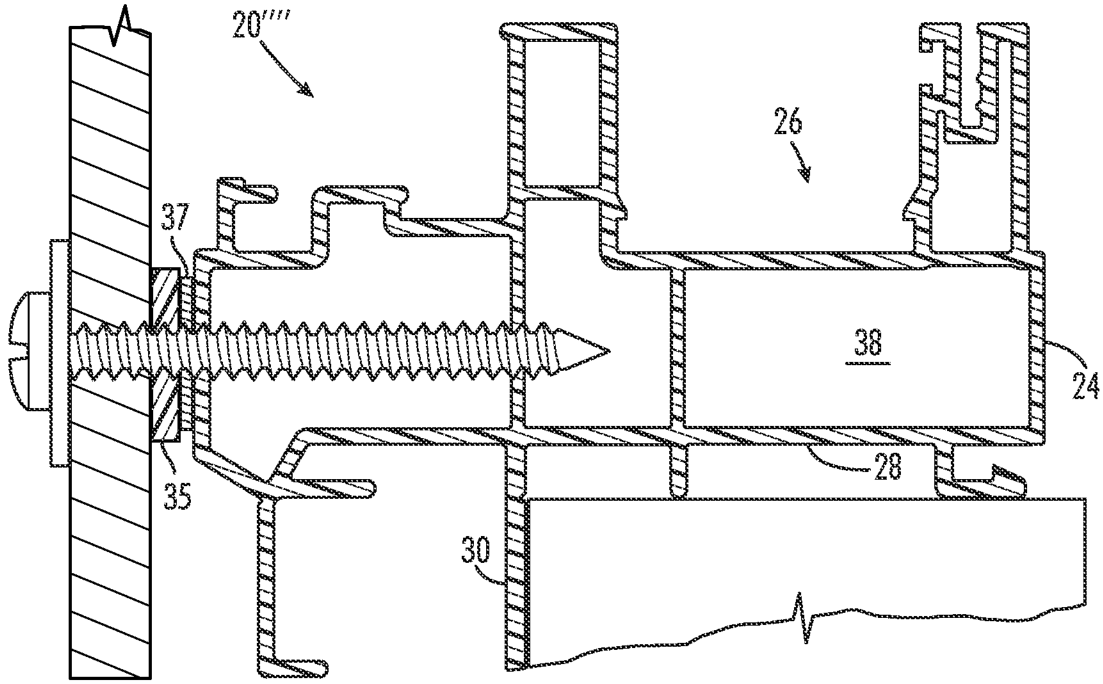

FIGS. 16A and 16B include further embodiments without a screw boss, wherein the lineal serves as the method of attachment for the fastener through the storm trim. In this aspect, the fastener attaches directly through the body of the lineal, wherein the lineal provides the attachment point, and through the nail fin 30 is secured to an opening in a building, typically along the building wall. In this aspect, as in other aspects, the storm trim, comprised of a cap 33, a stanchion 35, and an attachment layer 37 provide a customizable aesthetic, while providing a quick and rapid way to deploy a storm panel or covering to help prevent damage to a glazing or building. The storm trim provides for fastener locations, as well as a covering to prevent debris and other objects from entering the fastener locations.

In the example of FIG. 16A the storm trim is disclosed as the cap 33 is removed to prepare for securing a panel for protection. In the example, the cap 33 is removed from the stanchion 35, revealing a fastener identification line, or other marking that indicates the area in which the fasteners may be applied to connect with the insertable or extruded screw boss. In this example, the fasteners may be applied along a vertical indentation, forming a "v", that allows a guide for repetitive installation of a protective panel. Therefore, applying and reapplying into different fastener locations so as to keep the integrity of the lineal and the strength to withstand high winds and storms. The cap 33 is then placed back, following removal of the panel, and covers the unsightly fastener locations, which often leave a foramen that may allow debris, insects, and other items to enter the lineal.

In the example of FIG. 16B, the panel is secured by the fastener to the lineal, and in turn through the lineal to the wall of a building. In the example a medium length fastener is used, in other aspects a longer fastener may be used, one that may also pierce the second receptacle 38, and the second receptacle may or may not have a screw boss inserted or formed within. The glazing secures into the recess 26, and is protected by the panel secured to the stanchion 38, the attachment layer 37, and the lineal by way of a fastener. Additional disclosures include applying a caulk or sealant to the stanchion 35, which may increase the water barrier or otherwise provide for additional support in securing the panel, or cap, depending upon whether the panel is attached.

Figure 17A:
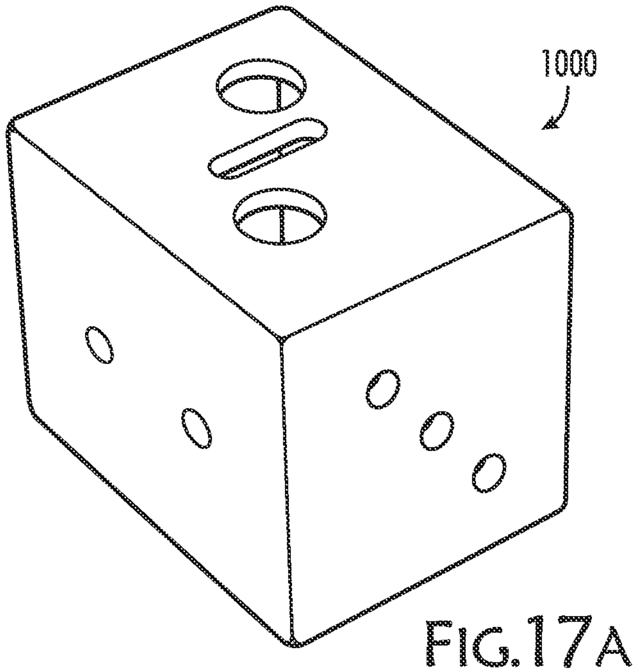
FIGS. 17A and 17B illustrate example embodiments of an interior mounting bracket.
Figure 17B:
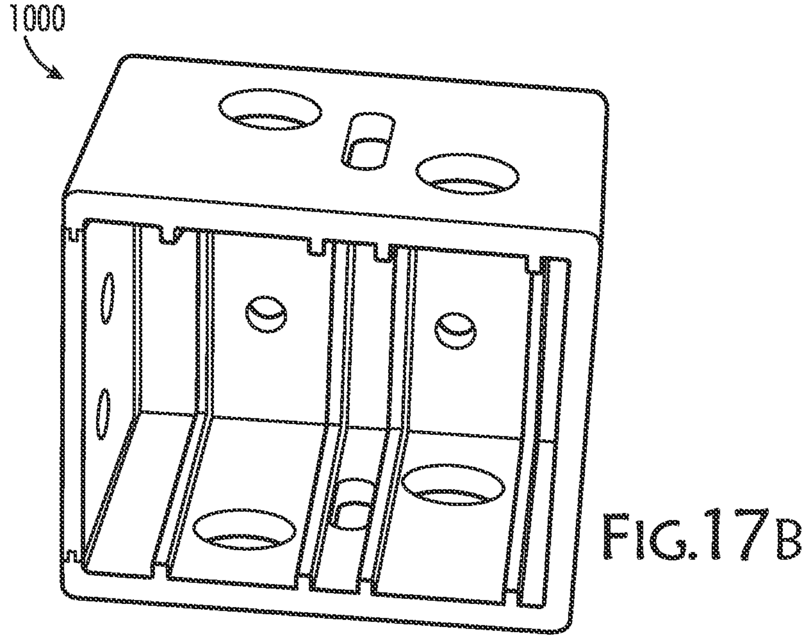

Referring now to the examples in FIGS. 17A-B, an interior mounting bracket 1000 is disclosed that is capable of mounting to and fastening to the frame of the window and door. In one aspect the interior mounting bracket 1000 has predefined fastener holes that are aligned with the first jamb, a second jamb, a header, and a sill, which in turn, when configured together, form a frame. The interior mounting brackets may come in different configurations depending on the size of the window or door and the size of the window treatment. The interior mounting brackets may also be made of polymeric material, a metal, formed from wood or other cellulosic product, and may be coated, painted, or otherwise have an additive applied thereto for aesthetics or practical purposes.

Continuing with FIGS. 17A-B, in one aspect, the interior mounting brackets are configurable and able to be assembled on site and applied directly to a lineal of the disclosed frame. In one aspect they may arrive in as many as five pieces with the walls of the mounting bracket clicking together through friction fit. In another aspect the lineal, including the first jamb, second jamb, header, and sill may have markings or configurations for applying a mounting bracket, such as a line or indentation. For example, the mounting brackets may be mounted to the header, and the sill may have additional mounting brackets as stays to hold the window treatment in a down position. Continuing, the interior mounting bracket 1000 may be custom for the particular window treatment and may have grooves, channels, holes, and inserts that are adapted for a typical brand of window treatment. The disclosure herein provides for a plurality of interior mounting brackets that may configure through fasteners to the lineal embodiments as disclosed herein.

Figure 18:
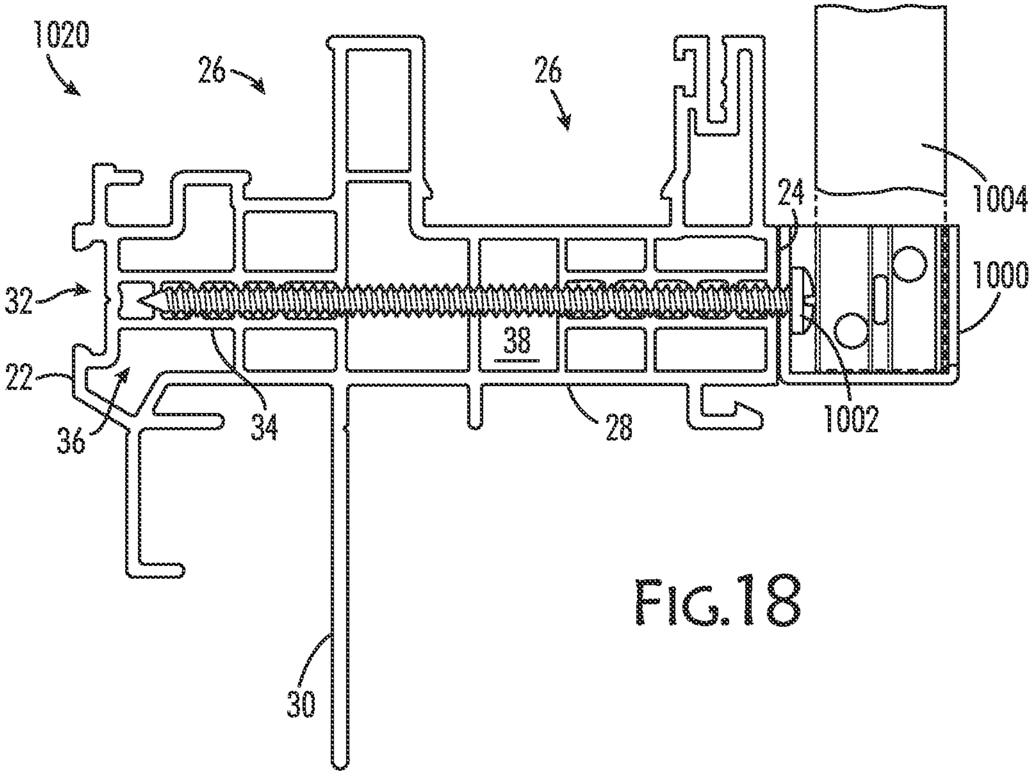
FIG. 18 illustrates an example embodiment of a lineal with an extruded screw boss configuration and an interior mounting bracket.

Referring now to FIG. 18, an example embodiment of a lineal with an extruded screw boss configuration and an interior mounting bracket. In the example, a window treatment 1004 is configured to an interior mounting bracket 1000, which is held to the lineal (jamb, header, sill) through a fastener 1002 to two extruded screw boss elements, each in a receiving channel (36, 38) and a fastener 1002 piercing both receiving channels and a plurality of walls. In one aspect, the screw boss elements, add additional support to the window treatment, for example when wooden slats are utilized or heavier window treatments, a lineal section with two screw boss elements may be utilized. In other aspects, with lighter window treatments, just the walls of the lineal may support the interior mounting bracket along with the window treatment.

Figure 19:
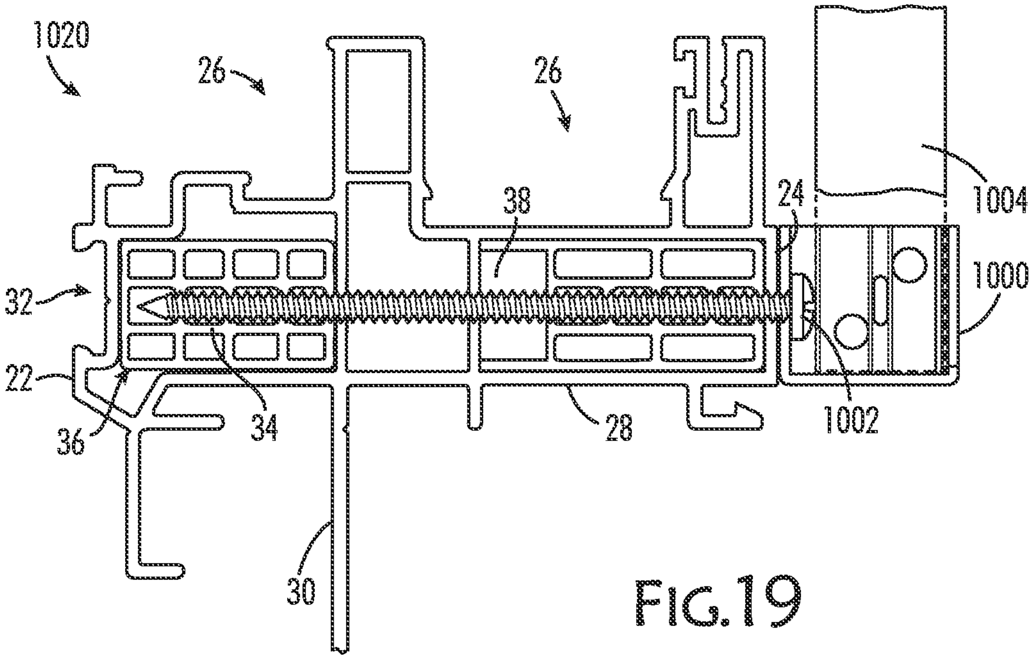
FIG. 19 illustrates an example embodiment of a lineal with an insertable screw boss configuration and an interior mounting bracket.

Referring now to FIG. 19, an illustration of an example embodiment of a lineal with an insertable screw boss configuration and an interior mounting bracket. In one aspect the insertable screw boss is fed into the receiving channel 38 and 34, wherein each of the screw bosses provide support for a fastener through the interior mounting bracket 1000. In other aspects, the storm trim and storm panel are applied through the same screw bosses as they run the length of the given lineal. In other aspects the screw bosses are extruded within the lineal, or one may be extruded and the other insertable, as disclosed in additional example embodiments.

In one aspect the glazing is applied to the recesses 26 which may be protected by a storm panel (not depicted) attached with a fastener through a receiving chamber 32, wherein the fasteners hold a storm panel such as a wood panel or fabric, or other composite that shields the glazing from high winds and storm debris. A nail fin 30 is applied to the framing of the building and secures the lineal in place, along with the friction fit of the frame itself and the glazing.

In the example of FIG. 19, the window treatment 1004 is shown configured to the interior mounting bracket 1000, wherein the interior mounting bracket 1000 is held in place by a fastener 1002 through an insertable screw boss in a receiving chamber 38 and an additional insertable screw boss in a second receiving chamber 34.

Figure 20:
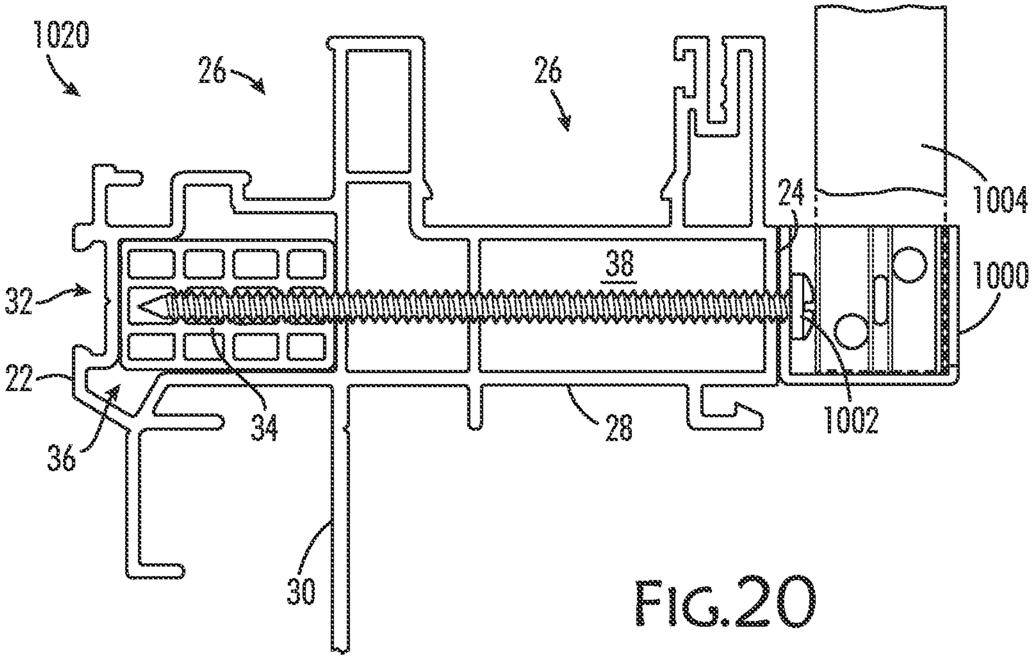
FIG. 20 illustrates an example embodiment of a lineal with an insertable screw boss and an empty receiving channel with an interior mounting bracket.

Referring now to FIG. 20, an illustration of an example embodiment of a lineal with an insertable screw boss and an empty receiving channel with an interior mounting bracket. In the example the window treatment 1004 is configured to the interior mounting bracket 1000, and the fastener 1002 is held in place through penetration of two walls on the receiving channel 38, and the insertable screw boss in the second receiving channel 34. In this aspect the walls provide the first support for the interior mounting bracket, and the insertable screw boss provides additional support. Further, the insertable screw boss is configured to receive a fastener from the outside to hold the storm panel in place when configured to protect against strong winds, or other physical intrusion.

Figure 21:
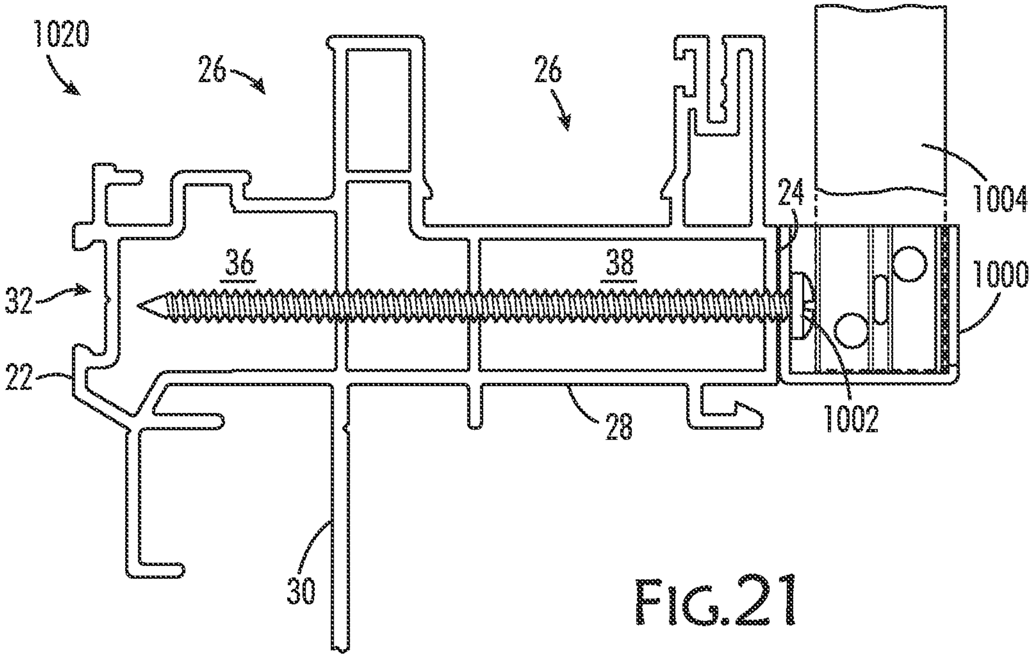
FIG. 21 illustrates an example embodiment of a lineal with two empty receiving channels and an interior mounting bracket.

Referring now to FIG. 21, an illustration of an example embodiment of a lineal with two empty receiving channels and an interior mounting bracket. In this example the walls from the lineal support the fastener 1002, which in turns holds the interior mounting bracket 1000 against the lineal and supports the weight of the window treatment 1004. In this example the window treatment 1004 is often of a polymeric material or fabric with a lighter weight. Further, the walls of the lineal also support the storm panel (not shown) when a fastener is driven from the exterior in. In this aspect additives may be applied to the polymeric extrusion to increase the rigidity of the material to support the fasteners, further the wall layers may be extruded with a larger thickness to aid in support as well.

Figure 22:
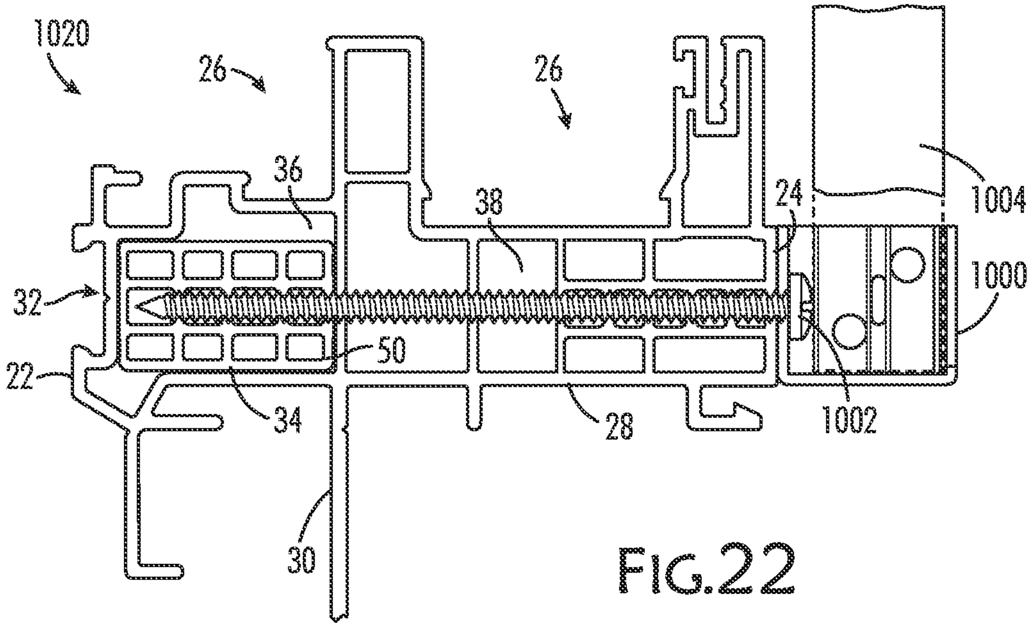
FIG. 22 illustrates an example embodiment of a lineal with one insertable screw boss and one extruded screw boss and an interior mounting bracket.

Referring now to FIG. 22, an illustration an example embodiment of a lineal with one insertable screw boss and one extruded screw boss and an interior mounting bracket 1000. In the example an insertable screw boss 50 is on the outside receiving chamber 35, and an extruded screw boss is on the inside receiving chamber. The fastener 1002 is drive through both screw bosses, and secures the interior mounting bracket 1000 to the lineal. In other aspects a fastener may only reach one screw boss, in examples with a plurality of screw bosses, the size of the fastener depends upon the application, with longer and larger fasteners supporting greater window treatment sizes and dimensions.

Figure 23:
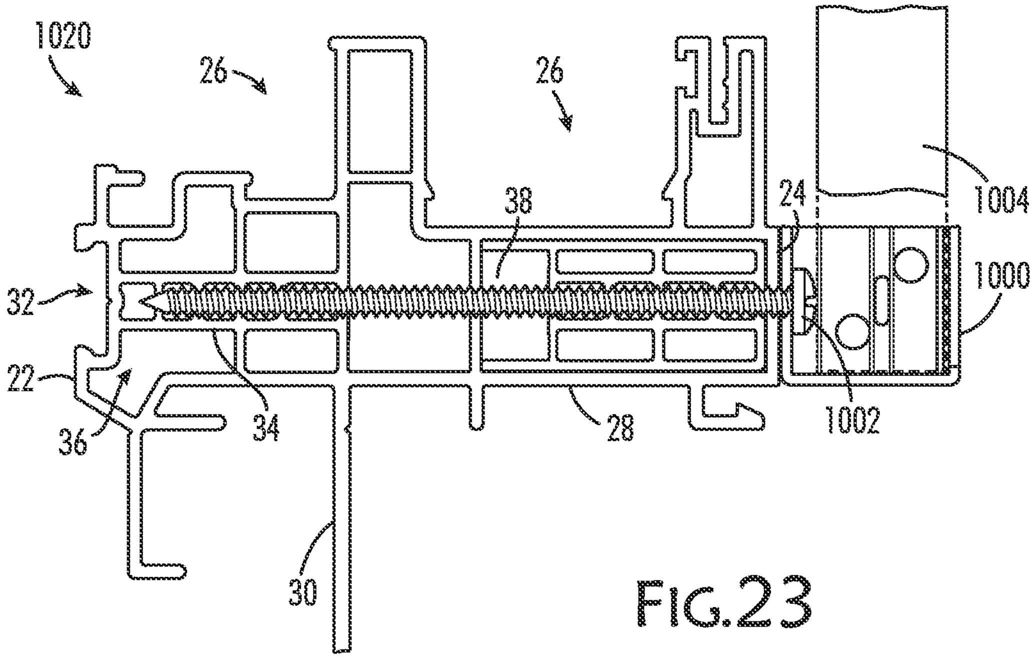
FIG. 23 illustrates an example embodiment of a lineal with one insertable screw boss and one extruded screw boss and an interior mounting bracket.

Referring now to FIG. 23, an illustration with an example embodiment of a lineal with one insertable screw boss and one extruded screw boss and an interior mounting bracket. In the example the outer receiving chamber is comprised of an extruded screw boss, and the inner receiving chamber is comprised of an insertable screw boss.

Figure 24:
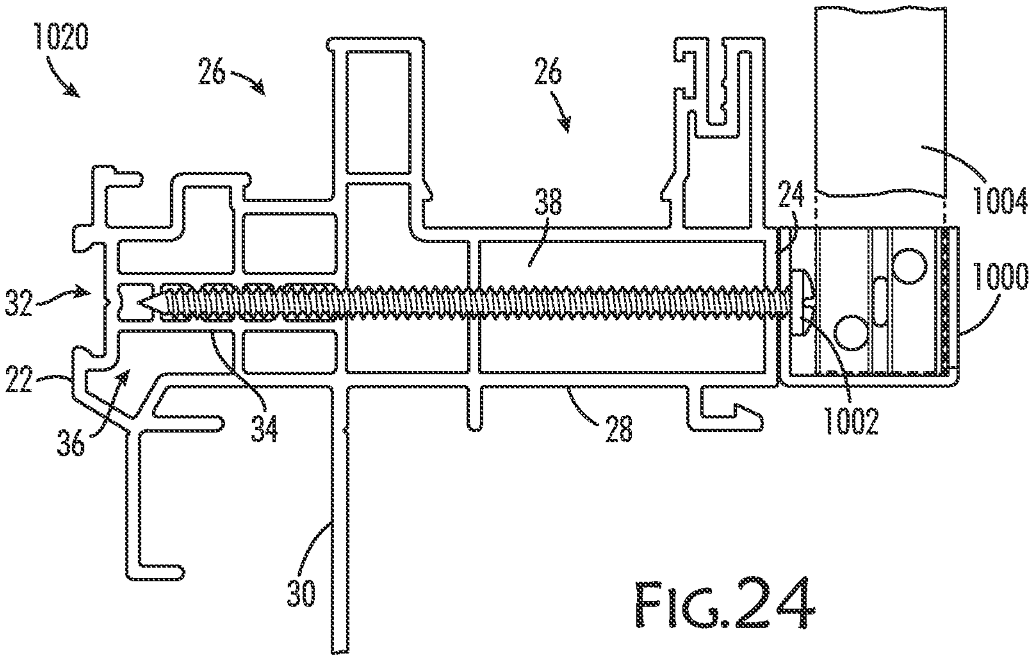
FIG. 24 illustrates an example embodiment of a lineal with one extruded screw boss and an empty receiving channel, along with an interior mounting bracket.

Referring now to FIG. 24, an illustration with an example embodiment of a lineal with one extruded screw boss and an empty receiving channel, along with an interior mounting bracket. In this example the outer receiving chamber is comprised of an extruded screw boss, and it provides support for the fastener 1002 to hold the interior mounting bracket 1000.

Figure 25:
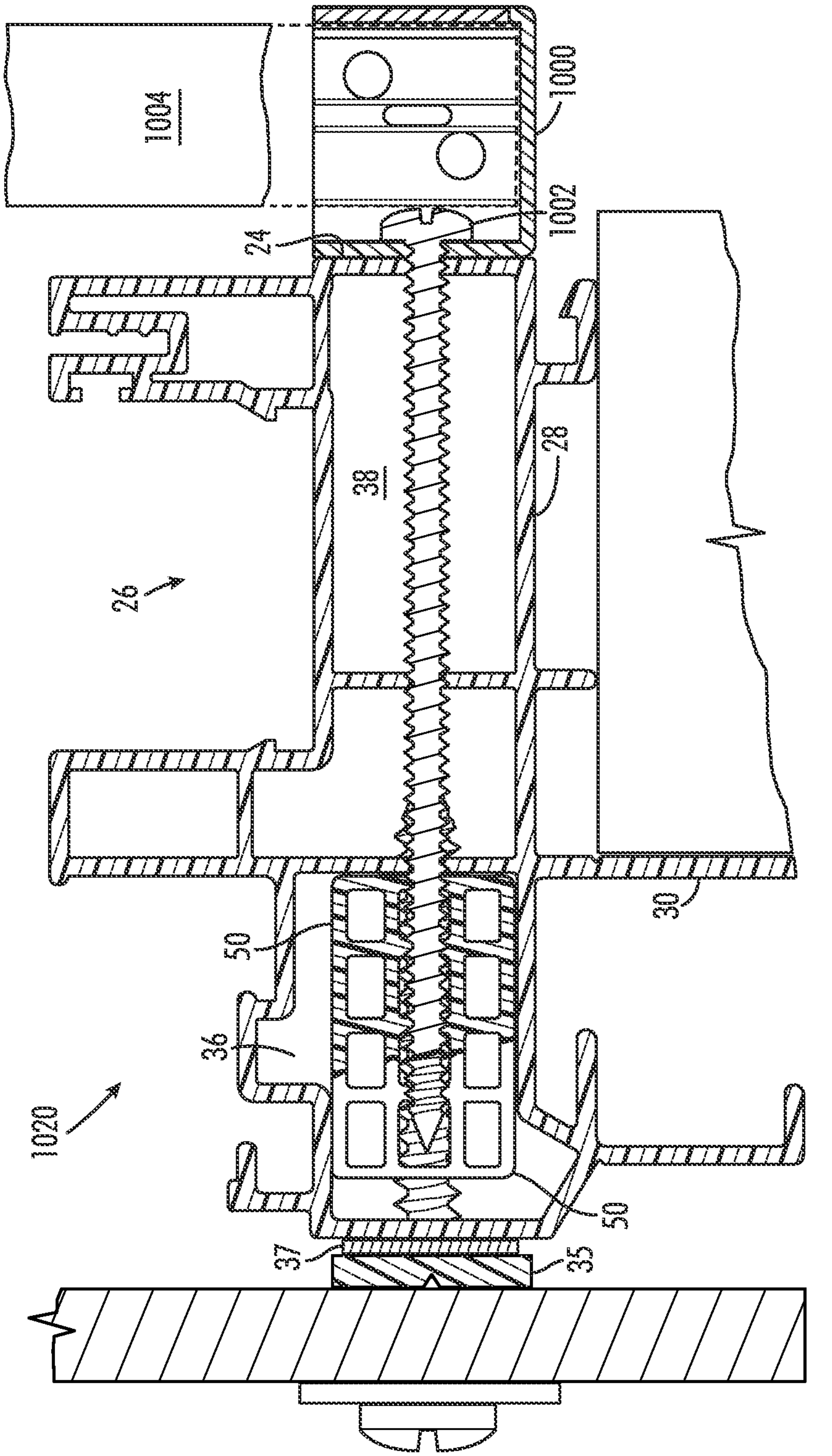
FIG. 25 illustrates an example embodiment with a storm panel installed on the storm trim face, along with an interior mounting bracket.

Referring now to FIG. 25, an illustration of an example embodiment with a storm panel installed on the storm trim 35, along with an interior mounting bracket 1000. In the example the storm trim cap is removed and a storm panel secured through an outer fastener and a washer. The outer faster may pierce one or both screw bosses through each receiving chamber, and/or in alternative embodiments may be held by the walls of the lineal. The interior fastener pierces the interior mounting bracket 1000, and two walls of the interior receiving chamber 38, before piercing the insertable screw boss 50 in the outer receiving chamber 36.

Figure 26:
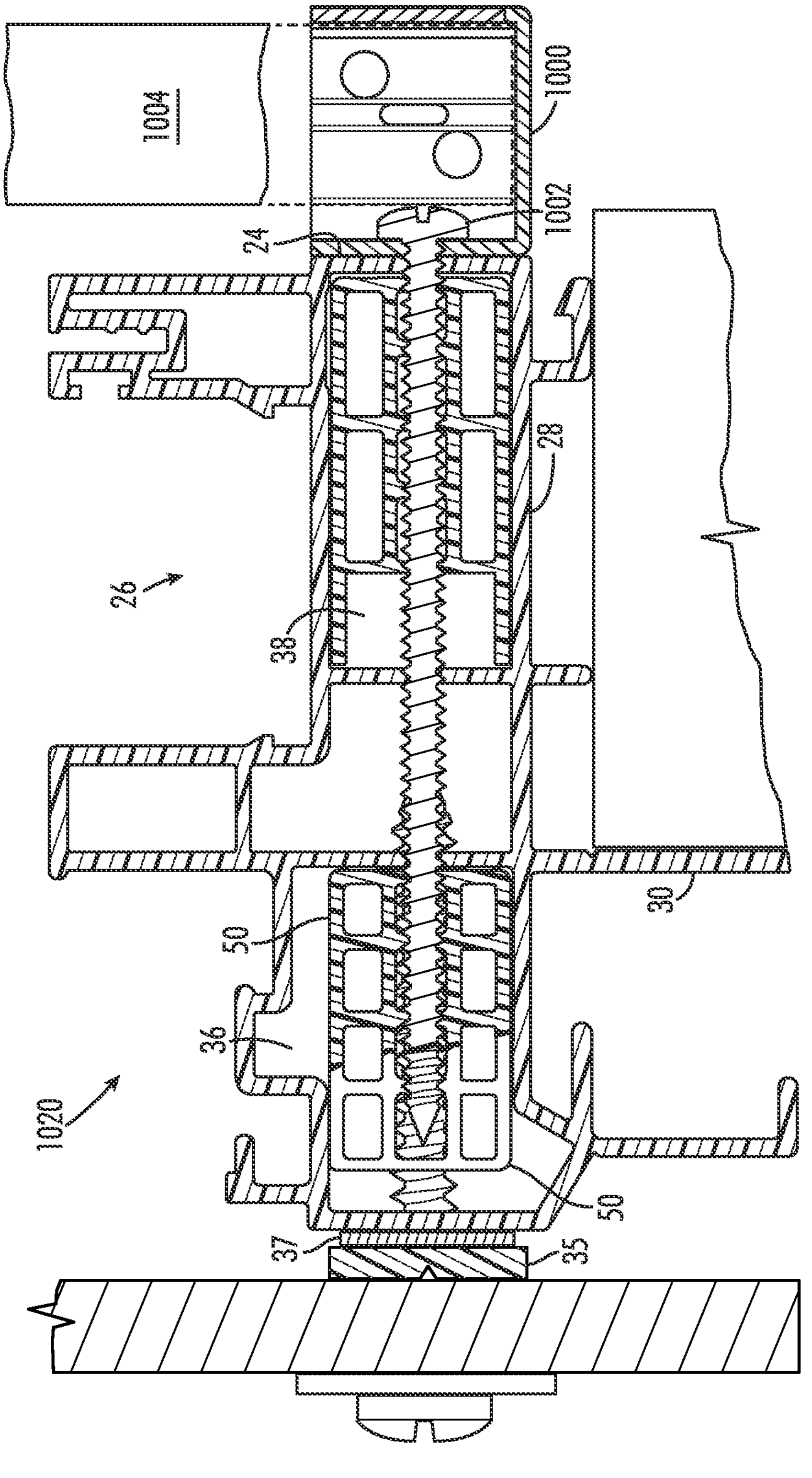
FIG. 26 illustrates an additional example embodiment of FIG. 25 with two insertable screw boss, along with a storm panel installed and an interior mounting bracket.

Referring now to FIG. 26, an illustration of an additional example embodiment of FIG. 25 with two insertable screw boss, along with a storm panel installed and an interior mounting bracket. In this example, the storm panel is secure to the storm trim 35, and fastened through an outer fastener to the outer screw boss 50. The outer screw boss 50 is an insertable screw boss, in other aspects it may be an extruded screw boss. The interior fastener 1002 is configured with the interior mounting bracket 1000, and secured through an interior insertable screw boss in the inner receiving chamber 38. Disclosed are recesses for glazing 26, a nail fin 30 for securing to a wall in a building, and the window treatments 1004 that are configured with the interior mounting bracket 1000.

Figure 27:
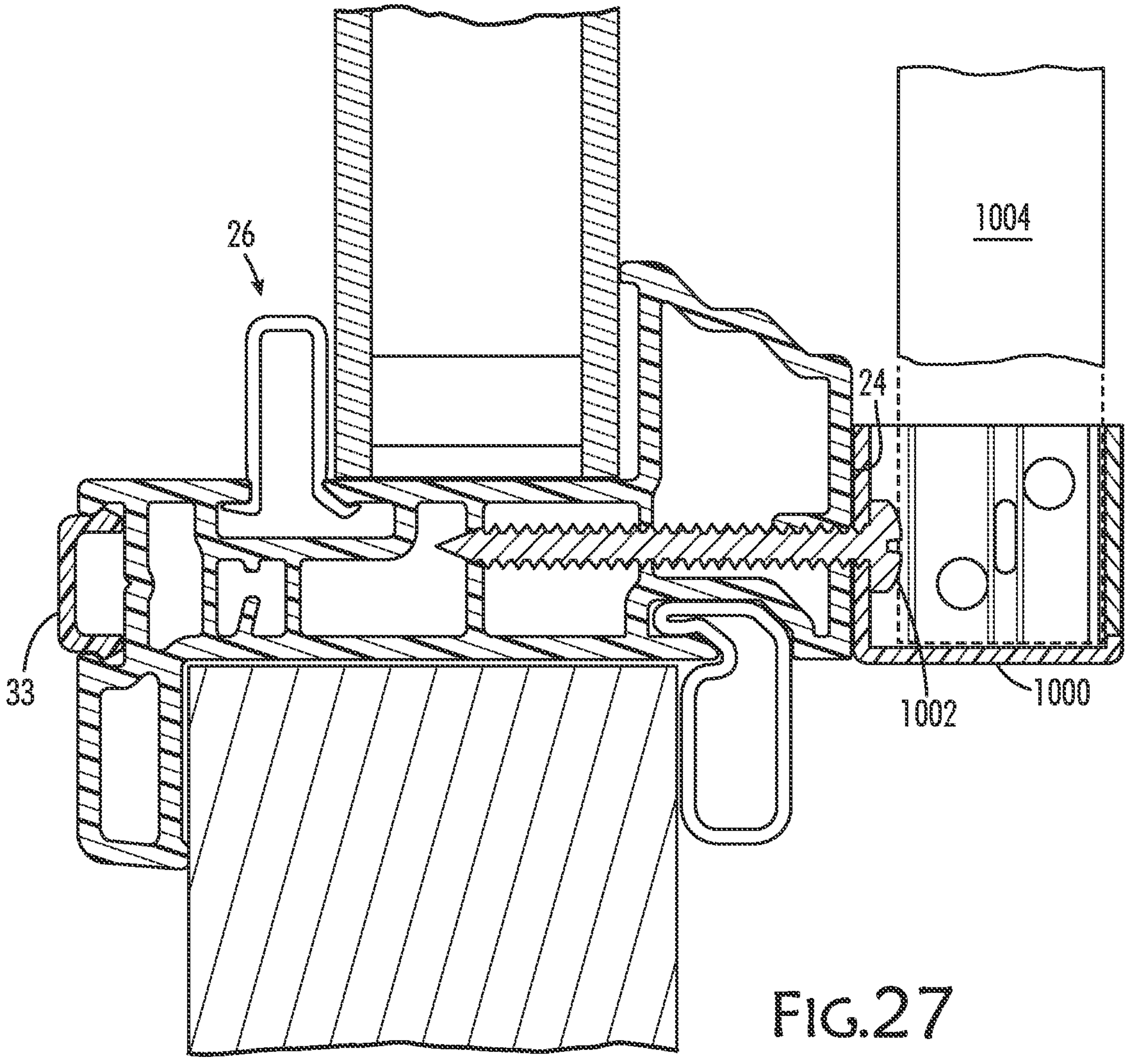
FIG. 27 illustrates an example embodiment of a door lineal, with a storm trim cap for mounting a storm panel, and an interior mounting bracket for mounting window treatments.

Referring now to FIG. 27, an illustration of an example embodiment of a door lineal, with a storm trim cap for mounting a storm panel, and an interior mounting bracket for mounting window treatments. In the example the interior mounting bracket 1000 is aligned with the walls on the lineal to provide support and strength. The fastener is held in place by the walls, but in additional embodiments may have an insertable or extruded screw boss. The interior fastener 1002 is secured through a hole or marking on the interior mounting bracket 1000, and is held securely against the body of the lineal. An adhesive may also be applied in between the interior mounting bracket 1002 and the lineal for added strength. The window treatments 1004 are configured into the interior mounting bracket 1002, and may further be configured to a stop at the bottom of the door.

Continuing, in the example a glazing is placed into the recess and held by adhesives and a friction fit. The storm cap, on the exterior face is held by a friction fit, and is removable for attachment of a storm panel. The storm panel is held in place by fasteners applied through the indication line, which pierces the lineal walls and holds the panel in place. In one aspect the storm panel may be a vinyl screen, plywood, a polymeric material, or other wood or metallic covering that can suppress high winds and physical objects.

In additional aspects, the door lineal as disclosed in FIG. 27 may include a storm boss. In some aspects the storm panel may be held with a fastener from the outside and an interior mounting bracket held from a fastener on the inside, along the same lineal and support may be provided by the lineal walls. Further, as disclosed herein, all embodiments may have additional adhesive applied, and or may be secured by a plurality of fasteners into the lineal walls, the screw bosses, and at times may be held through friction fit or other mechanical means.

Figure 28:
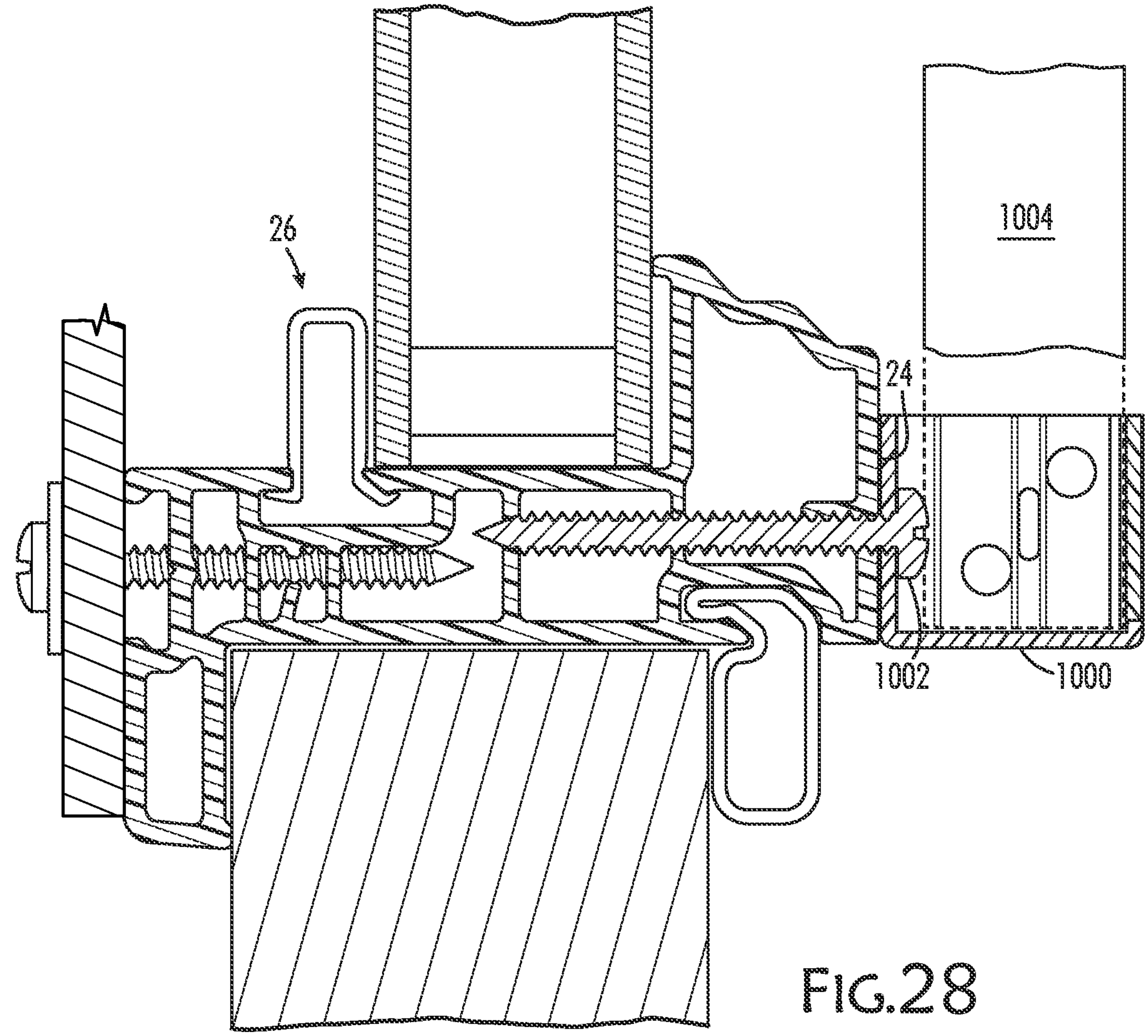
FIG. 28 illustrates an example embodiment of a door lineal with a storm trim cap removed and a storm panel mounted, and an interior mounting bracket for mounting window treatments.

Referring now FIG. 28, an illustration of an example embodiment of a door lineal with a storm trim cap removed and a storm panel mounted, and an interior mounting bracket for mounting window treatments. In the example, the window treatment 1004 is adapted to an interior mounting bracket 1000. The interior mounting bracket 1000 is secured to the door lineal on the interior side 24, through a fastener 1002, which pierces the walls of the lineal for support. In additional embodiments a screw boss may be present to further provide support for the fastener.

Figure 29:
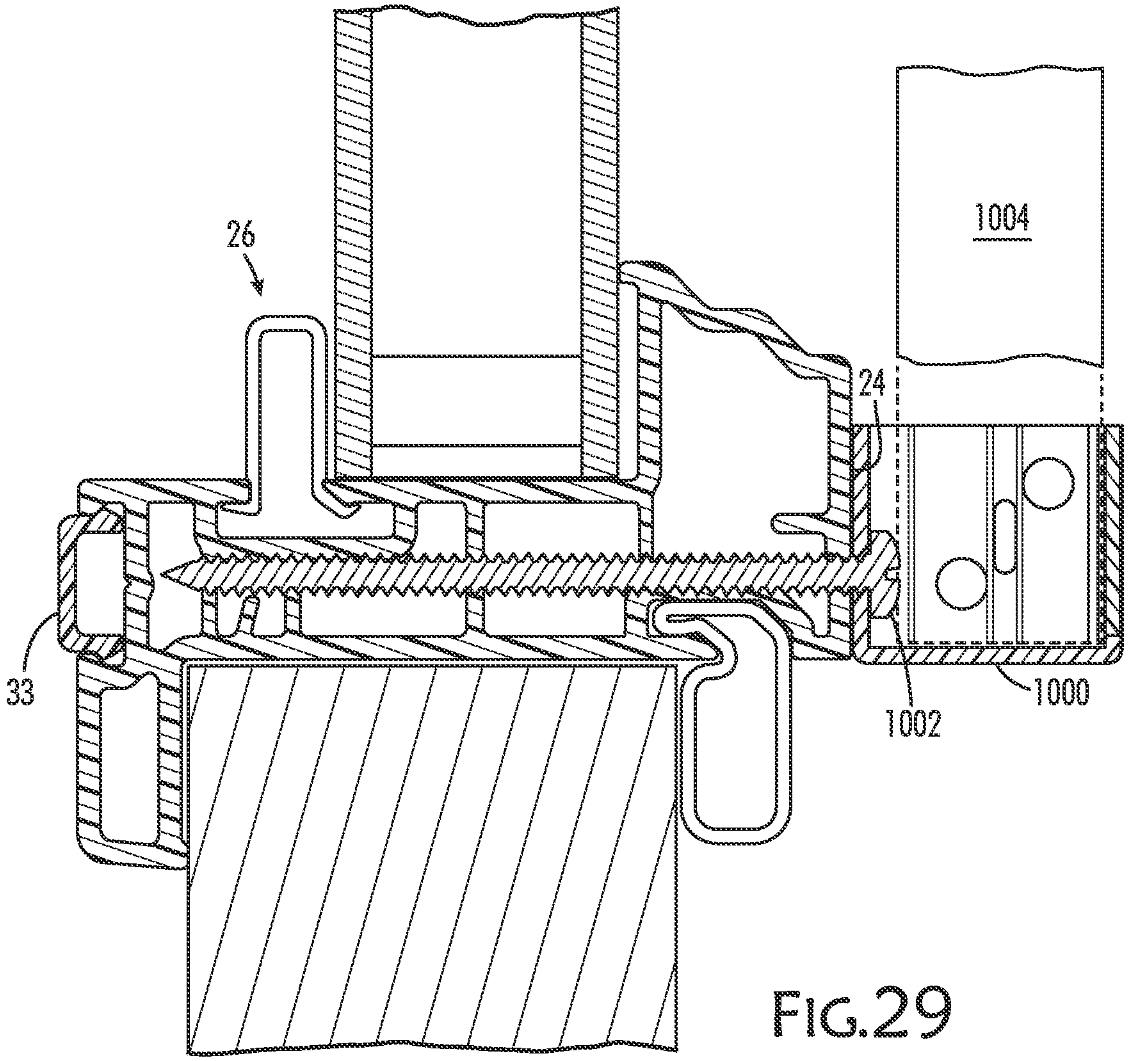
FIG. 29 illustrates an example embodiment of a door lineal, with a storm trim cap for mounting a storm panel, and an interior mounting bracket for mounting window treatments, wherein the interior mounting bracket is held with a fastener through a screw boss.

Referring now to FIG. 29, an illustration of an example embodiment of a door lineal, with a storm trim cap for mounting a storm panel, and an interior mounting bracket for mounting window treatments, wherein the interior mounting bracket is held with a fastener through a screw boss. In the example the window treatment 1004 is adapted to the interior mounting bracket 100, and held in place by a long fastener 1002, that pierces multiple walls and a screw boss of the lineal. In some embodiments the screw boss is extruded, in other it may be an insertable screw boss.

The present disclosure thus teaches that the same frame profile that includes a receptor channel, or a receiving channel, can include an extruded screw boss or an inserted screw boss or be left empty depending on the exposure of the individual windows or doors to severe weather or other source of impact and the need for a stronger hold on the panel fasteners, and the interior mounting bracket. That is, the walls of the lineal may in some cases provide support to incorporate the storm panel and to secure the interior mounting bracket. The same frame profile that includes a receptor channel facing outward can also include a receptor channel facing inward so that an interior panel can be used to provide temporary protection to the occupants of a room, especially if that window will be mounted high off the ground where exterior panel attachment would be risky to the installer or if the severe weather arrived before exterior panels could be attached. In high crime areas, vandalism may be more of a concern than severe weather, and other window protection can be substituted for panels and fastened in the same manner as panels. Accordingly, the present disclosure teaches how the windows of a home or building can be customized for either the severe weather of a coastal environment or the risks of a high crime environment, while having a pleasing uniform external appearance and an integrated mounting bracket for interior aesthetics.

Therefore, the following is claimed:

1. A storm protection system with interior options for an opening in a building, comprising:

(a) a first jamb, a second jamb, a header, and a sill, each with a glazing recess, and each with a receptacle for inserting a screw boss that runs a length of each of the first jamb, the second jamb, the header, and the sill, wherein joined define a frame for the opening in a building;

(b) glazing received by the glazing recess of each of the first jamb, the second jamb, the header, and the sill;

(c) a storm track configured to an exterior side of the frame to receive a storm panel, wherein the storm track identifies fastener locations for the screw boss within the frame, and wherein the storm track comprises a cap, a stanchion, and an attachment layer for attachment to the frame; and wherein the cap is removable to expose the stanchion and replaceable to conceal the fastener locations; and (d) an interior mounting bracket, wherein the interior mounting bracket is configured to be held to an interior side of the frame through a fastener that enters at least one screw boss and one wall of the frame, wherein the interior mounting bracket is structured to receive a window treatment, wherein the window treatment engages the interior mounting bracket independent from the fastener.

2. The system of claim 1, wherein the interior mounting bracket is configured to attach a storm resistant panel on the interior side of the frame.

3. The system of claim 1, wherein the interior mounting bracket is secured by two or more fasteners.

4. The system of claim 1, wherein the interior mounting bracket is comprised of a polymeric material.

5. The system of claim 1, wherein the screw boss is co-extruded with the first jamb, the second jamb, the header, and the sill.

6. The system of claim 1, further comprising fasteners for securing the frame to the opening in the building, wherein the fasteners pierce a nail fin of the frame.

7. The system of claim 1, wherein the stanchion has a groove to indicate fastener placement to enable fastening to the screw boss that runs the length of each of the first jamb, the second jamb, the header, and the sill.

8. A method for installing a storm protection system in an opening of a building, comprising:

installing a first jamb, a second jamb, a header, and a sill, each with a glazing recess, and each with a receptacle for inserting a screw boss that runs a length of each of the first jamb, the second jamb, the header, and the sill, wherein joined define a frame for the opening in a building;

securing glazing into the glazing recess of each of the first jamb, the second jamb, the header, and the sill;

installing a storm track configured to an exterior side of the frame to receive a storm panel, wherein the storm track comprises a cap, a stanchion, and an attachment layer for attachment to the frame and wherein the cap is removable to expose the stanchion and replaceable to conceal fastener locations;

fastening an interior mounting bracket to an interior side of the frame, wherein fastening applies a fastener to the interior mounting bracket and through the screw boss and wall of the frame; and applying a window treatment to the interior mounting bracket, wherein the window treatment engages the interior mounting bracket independent from the fastener.

9. The method of claim 8, wherein fastening the interior mounting bracket pierces at least one wall and one screw boss of the frame.

10. The method of claim 8, wherein fastening the interior mounting bracket pierces at least two independent screw bosses on the frame.

11. The method of claim 8, wherein applying the window treatment applies a window blind to the interior mounting bracket.

12. The method of claim 8, wherein fastening the interior mounting bracket pierces at least two walls of the frame.

13. The method of claim 8, wherein fastening the interior mounting bracket fastens a left interior mounting bracket and a right interior mounting bracket.

14. The method of claim 8, further comprising applying fasteners for securing the frame to the opening in the building, wherein the fasteners pierce a nail fin of the frame.

15. The method of claim 8, wherein the stanchion has a groove to indicate fastener placement to enable fastening to the screw boss that runs the length of each of the first jamb, the second jamb, the header, and the sill.

16. The method of claim 8, wherein the interior mounting bracket is fastened by two or more fasteners through defined holes on the interior mounting bracket.

17. The system of claim 1, wherein the interior mounting bracket defines a channel to receive the window treatment, wherein the window treatment is secured with the interior mounting bracket within the channel.

18. The system of claim 17, wherein interior mounting bracket defines a groove within the channel to engage the window treatment.

19. The method of claim 9, wherein the interior mounting bracket defines a channel to receive the window treatment, wherein the window treatment is secured with the interior mounting bracket within the channel.

20. The method of claim 19, wherein interior mounting bracket defines a groove within the channel to engage the window treatment.

21. The system of claim 1, wherein the storm panel comprises a flexible screen or plywood.

* * * * *